US011285501B2

(12) United States Patent
Widhalm

(10) Patent No.: US 11,285,501 B2
(45) Date of Patent: Mar. 29, 2022

(54) DEVICE AND METHOD FOR BINDING DUST

(71) Applicant: Stefan Widhalm, Salzburg (AT)

(72) Inventor: Stefan Widhalm, Salzburg (AT)

( * ) Notice: Subject to any disclaimer, the term of this patent is extended or adjusted under 35 U.S.C. 154(b) by 352 days.

(21) Appl. No.: 16/094,818

(22) PCT Filed: Oct. 6, 2017

(86) PCT No.: PCT/EP2017/075501
§ 371 (c)(1),
(2) Date: Oct. 18, 2018

(87) PCT Pub. No.: WO2018/065586
PCT Pub. Date: Apr. 12, 2018

(65) Prior Publication Data
US 2021/0229122 A1    Jul. 29, 2021

(30) Foreign Application Priority Data

Oct. 6, 2016    (AT) .............................. A 50903/2016
Oct. 6, 2016    (DE) ..................... 20 2016 105 569.5
(Continued)

(51) Int. Cl.
*B05B 9/04*    (2006.01)
*B05B 12/04*    (2006.01)
(Continued)

(52) U.S. Cl.
CPC ............... *B05B 9/0423* (2013.01); *B05B 1/20* (2013.01); *B05B 12/04* (2013.01); *B01D 47/06* (2013.01); *B05B 12/085* (2013.01); *B08B 17/02* (2013.01)

(58) Field of Classification Search
CPC ......... B05B 1/20; B05B 9/0423; B05B 12/04; B05B 12/085; A01M 7/0071;
(Continued)

(56) References Cited

U.S. PATENT DOCUMENTS 479,979 A    8/1892   Glenn
2,722,456 A    11/1955   Glessner
(Continued)

FOREIGN PATENT DOCUMENTS

AT          512 490        8/2013
AU    2014100382 A4    5/2014
(Continued)

OTHER PUBLICATIONS

Chinese Office Action dated May 28, 2021 from Chinese Application No. 201780062055.7. 26 Pages.
(Continued)

*Primary Examiner* — Ryan A Reis
(74) *Attorney, Agent, or Firm* — HoustonHogle LLP

(57) ABSTRACT

The invention relates to an apparatus for the binding of dust, comprising a binder reservoir, which provides liquid binder which is under pressure,
a binder line which is connected to the binder reservoir, wherein there is connected to the binder line at least one spray nozzle which may be located in the vicinity of a dust source. The apparatus is in particular so designed that large areas, which may extend over distances of several 100 m, may be supplied with binder, which may also be discharged, with these dimensions, in pulses at short intervals (1 second up to a few minutes).

35 Claims, 12 Drawing Sheets

(30) Foreign Application Priority Data

Figure 1:
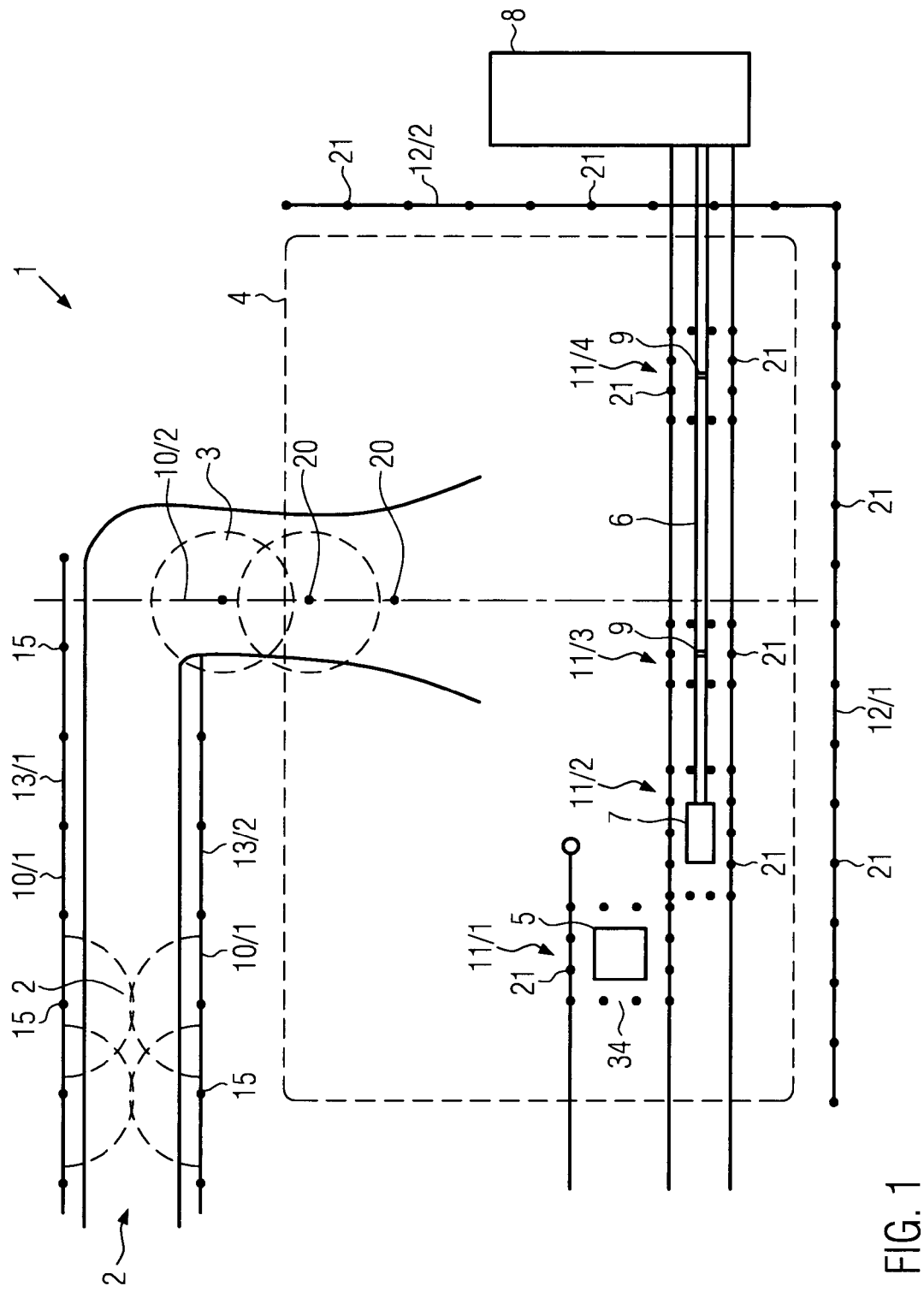

Oct. 6, 2016 (DE) .................. 20 2016 105 570.9
Oct. 6, 2016 (DE) .................. 20 2016 105 572.5

(51) Int. Cl.
  *B05B 1/20* (2006.01)
  *B01D 47/06* (2006.01)
  *B05B 12/08* (2006.01)
  *B08B 17/02* (2006.01)

(58) Field of Classification Search
  CPC .... A01M 7/0053; E01C 19/176; B08B 17/02; C09K 3/22; B01D 47/06
  See application file for complete search history.

(56) References Cited

U.S. PATENT DOCUMENTS

| | | | |
|---|---|---|---|
| 2007/0125558 A1* | 6/2007 | Embry | E21F 5/02 172/66 |
| 2008/0283623 A1* | 11/2008 | Haslem | B01D 1/16 239/1 |
| 2011/0163180 A1* | 7/2011 | Morrow | B05B 12/04 239/66 |
| 2013/0017336 A1 | 1/2013 | Bandura | |
| 2014/0061329 A1* | 3/2014 | Ngo | E01H 3/02 239/11 |
| 2014/0239080 A1 | 8/2014 | Nye | |
| 2016/0157445 A1* | 6/2016 | Mortensen | A01G 25/092 239/728 |
| 2016/0221769 A1 | 8/2016 | Keefer | |

FOREIGN PATENT DOCUMENTS

| | | |
|---|---|---|
| CN | 2888072 Y | 4/2007 |
| CN | 201660864 U | 12/2010 |
| CN | 203508461 U | 4/2014 |
| CN | 203 700 087 | 7/2014 |
| CN | 103925831 A | 7/2014 |
| CN | 104259024 A | 1/2015 |
| CN | 204214150 U | 3/2015 |
| CN | 204974263 U | 1/2016 |
| CN | 207951785 | 10/2018 |
| DE | 1 795 74 | 4/1906 |
| DE | 380 896 | 9/1923 |
| DE | 41 31 75 | 5/1925 |
| DE | 915 203 | 7/1954 |
| DE | 18 33 442 | 6/1961 |
| DE | 6 812 095 | 4/1969 |
| DE | 19 28 789 | 1/1970 |
| DE | 18 15 543 | 6/1970 |
| DE | 1 658 345 | 9/1970 |
| DE | 1 668 644 | 2/1972 |
| DE | 23 35 861 | 1/1975 |
| DE | 75 35 462 | 5/1977 |
| DE | 34 41 386 | 5/1986 |
| DE | 258 837 | 3/1988 |
| DE | 39 42 496 | 6/1991 |
| DE | 296 02 168 U1 | 6/1996 |
| DE | 297 18 708 | 11/1997 |
| DE | 202010001744 U1 | 5/2010 |
| DE | 20 2015 104 984 | 10/2015 |
| EP | 0 908 215 | 4/1999 |
| EP | 0 950 796 | 10/1999 |
| EP | 1 084 607 | 3/2001 |
| EP | 2049737 A1 | 4/2009 |
| JP | S5460139 A | 5/1979 |
| JP | 2002263604 A | 9/2002 |
| WO | WO 2008013444 | 1/2008 |
| WO | WO 2008020773 | 2/2008 |
| WO | WO 2008082316 | 7/2008 |
| WO | WO 2011095463 | 8/2011 |
| WO | WO 2014019311 | 2/2014 |
| WO | WO 2014161023 | 10/2014 |

OTHER PUBLICATIONS

International Preliminary Report on Patentability, dated Apr. 18, 2019, from International Application No. PCT/EP2017/075501, filed on Oct. 6, 2017. 26 pages.
Technische Stroemungslehre [Technical Fluid Mechanics], Leopold Boeswirth, Text and Exercise Book, 8th edition, Vieweg+Teubner, Chapter 12.3.
Germany Search Report created Jun. 1, 2017 from German Application No. 20 2016 105 570.9. 8 pages.
Germany Search Report created Jun. 2, 2017 from German Application No. 20 2016 105 569.5. 7 pages.
Germany Search Report created Jun. 6, 2017 from German Application No. 20 2016 105 572.5. 8 pages.
German Office Action dated Aug. 24, 2017 from Germany Application No. 50903/2016. 3 Pages.
International Search Report of the International Searching Authority, dated Dec. 22, 2017, from International Application No. PCT/EP2017/075501, filed on Oct. 6, 2017. 11 pages.
Written Opinion of the International Searching Authority, dated Dec. 22, 2017, from International Application No. PCT/EP2017/075501, filed on Oct. 6, 2017. 11 pages.
Singapore Search Report completed Sep. 4, 2020 from Singapore Application No. 11201903023P. 2 pages.
Singapore Written Opinion completed Sep. 4, 2020 from Singapore Application No. 11201903023P. 6 pages.

\* cited by examiner

DEVICE AND METHOD FOR BINDING DUST

RELATED APPLICATIONS

This application is a § 371 National Phase Application of International Application No. PCT/EP2017/075501, filed on Oct. 6, 2017, now International Publication No. WO 2018/065586, published on Apr. 12, 2018, which International Application claims priority to Austrian Application No. A 50903/2016, filed on Oct. 6, 2016, German Application No. 20 2016 105 569.5, filed on Oct. 6, 2016, German Application No. 20 2016 105 570.9, filed on Oct. 6, 2016, and German Application No. 20 2016 105 572.5, filed on Oct. 6, 2016, all of which are incorporated herein by reference in their entirety.

The present invention relates to an apparatus and a method for the binding of dust. Known from DE 297 18 708 U1 and EP 0 908 215 A2 respectively is an apparatus for the binding and/or the laying of dust. This apparatus is similar to a snow canon with an air jet, in which air is accelerated by means of a propeller or a rotor blade. In an air jet formed in this way, liquid is sprayed through one or more nozzles. The liquid is thus conveyed by the air jet in a finely distributed form. With this apparatus, large amounts of water may be distributed over a wide area.

Described in DE 1 658 345 U is a nozzle for the spraying of water or a water-air mixture for the suppression of dust in underground mining. The nozzle is designed to be self-cleaning, by means of a part which determines the outlet cross-section of the nozzle being subjected to a spring force. In the event of contamination of the nozzle there is excess pressure, which is overcome by the spring force. This enlarges the nozzle opening, and self-cleaning of the nozzle is effected.

Disclosed in German utility model DE 1 668 644 U is an apparatus for the suppression of dust from gases, in which steam of fine particles is used to envelop the dust particles.

Disclosed in WO 2014/019311 A1 is a further nozzle for the spraying of water, to remove and cool down dust from mining machinery. The water is distributed as finely as possible by means of an airflow.

Described in DE 915 203 B is a further method and a further device for the suppression of dust. A pipe system is provided with nozzles, from each of which a partial flow of a mixture of air and liquid is branched off. With each branching, the mix ratio between air and liquid is varied. This is used purposefully to vary along the pipe system the exiting mix ratio of fog in spray mist.

Described in EP 0 950 796 A1 is a spray mist unit for the suppression of dust, in which an air jet is mixed with water at one or more mixing nozzles. The mixing nozzles are located as close as possible to the dust originating points.

Described in DE 23 35 861 A1 is an apparatus for feeding into a cylindrical silo bulk material which easily becomes dusty. On being fed into the silo, the bulk material is wetted by a dust binder, which involves it being sprayed with the dust binder. The binder is water with the addition of a water-surface-relaxing substance.

Disclosed in DE 6 812 095 U is a further apparatus for the suppression of dust, in which the dust-creating substance is sprayed with water.

DE 1 815 543 relates to a device for the suppression of dust from coal extraction involving cutting and stripping. Here the direct point of dust origin and its closer environment should always be covered by a water screen. A mining machine is always in the area of a group of nozzles, by which it is covered with a water screen.

DE 41 31 75 A1 discloses a stripping lane spray system in which a stripping lane may be sprayed by several nozzles. This spray system is characterised by the fact that the nozzles assigned to an extraction frame are fed via a separate control valve and several spray zones of varying size may be formed. This should make it possible to adapt the spray zones to the respective conditions in an optimal manner and with a reduction in water consumption, since only as many nozzles are switched on are fed as are required for the greatest possible binding of dust.

Disclosed in DE 1 795 74 U is an apparatus for the suppression of the dust floating in the air, which has a washer which sucks in the dust-containing air and sprays it with water inside the washer, so that the dust is bound.

Described in AT 512 490 A1 is a high-pressure fog machine which may be used for, amongst other things, the binding of dust. The purpose of this high-pressure fog machine is to produce fog which is capable of floating. Water, in particular drinking water, is fed to spraying orifices, at which the water is sprayed out, under pressure of around 70-100 bar. By means of switchable valves, several zones may be provided and supplied with fog independently.

Disclosed by DE 34 41 386 A1 is a method for the suppression of dust. This uses a foam cannon which provides foam for binding the dust.

Disclosed in WO 2008/082316 A2 and WO 2008/020773 A1 respectively are, in each case, spray nozzles from which water may be sprayed. These spray nozzles are provided especially for various purposes in mining, including control of dusty conditions.

WO 2011/095463 A2 discloses a spray nozzle unit, in particular for the spraying of areas at risk of explosion in underground mining, and for use in ultra high speed fire suppression systems, with response times of less than 50 ms. This spray nozzle unit comprises a nozzle body with a nozzle opening for the release of spray fluid.

Disclosed by U.S. 2007/0125558 A1 is an apparatus for the binding of dust. This apparatus includes a supply tank for binder, wherein pumps may be driven by means of an optical sensor to convey binder from the binder supply tank and to discharge it accordingly. In this connection it is provided in particular for the pump or pumps to pump binder out of the supply tank and to discharge it via the relevant nozzles.

Disclosed in WO 2014/161023 A1 is a dust binding apparatus for containers. According to this apparatus it is provided that binder should be conveyed from an external supply tank and discharged through a corresponding pipe system by means of pumps into a container above a dust-generating medium, so as to bind the dust in this way.

DE 20 2015 104 984 U1 discloses an apparatus for the removal of floating dust, in particular fine dust, from the environmental air of a transport infrastructure. This apparatus include e.g. a spray unit with a pressure generator to provide a pressure difference. The spray unit presses or sucks liquid solution out of an intermediate container which is fed via a supply line, not shown. Here it is provided, by means of the spray units, to transfer the liquid solution from the ground, at the height of which each intermediate container is approximately mounted, into an elongated spray line. Nozzles are arranged along the length of the spray line, and from these nozzles the liquid solution is sprayed in drop form into the environmental air.

DE 75 35 462 U discloses a control unit for the switch operation of spray nozzles for the suppression of dust in mining operation. This involves the provision of spray nozzles which may be switched on and off individually using a lever or in groups by means of suitable control valves. Here a control unit may be used for remote control of the control valves by means of suitable switching devices. The spray nozzles should be controlled in such a way that the dust, irrespective of the operating speed of a mining machine, is effectively suppressed directly at the point of origin, i.e. in the operating area of the mining machine.

Disclosed in DE 18 15 543 A is a device for the suppression of dust. This involves the provision of a multiplicity of nozzles, combined into jointly operable groups in such a way that the respective group areas intersect, so that in each case that nozzle group may be operated within which the mining machine is located, in order to suppress the dust produced by the mining machine.

U.S. Pat. No. 2,722,456 A discloses a spraying apparatus which includes a supply tank. Connected to the supply tank via a line is a pump for extracting spray medium from the supply tank. The pump may be in the form of a gear pump. Also connected to the pump is a line to which are fitted several nozzles for discharge of the spray medium. Also provided is a valve to control the output of the spray medium. The volumetric flow of the spray medium taken from the supply tank may be set by means of a further valve. Also described in the application is that the spray medium is conveyed to the nozzles by means of a pressure generated by the pump. In addition, another line branches off from the line into the supply tank, to which corresponding nozzles are connected, in order to agitate, mix and stir the spray medium.

Disclosed in EP 1 084 607 A1 is a movable storage unit. This storage unit includes a pressure vessel which contains means for exerting compressive forces on the water held in the pressure vessel. The means for exerting compressive forces may here be provided in the pressure vessel itself or on the pressure vessel, e.g. by a pressure equalising vessel. According to an embodiment, the pressure vessel has a deformable diaphragm which divides the pressure vessel into a bottom chamber and a top chamber. The bottom chamber may be filled with water via a line and then reduces the top chamber, in which is provided a coil spring to pressurize the diaphragm. Instead of the coil spring, an inert gas such as nitrogen or carbon dioxide may be used as compressible pressure medium in the chamber. There a discharge fitting is directed on to the areas to be watered, and opened. Provided for discharge is preferably a spray nozzle with upstream operating valve 32.

Disclosed in DE 000P0047416MAZ is an overhead sprinkler system with automatically operating shutoff device. This overhead sprinkler system is designed e.g. for sprinkling three different sprinkling zones I, II and III.

Disclosed in DE 75 35 462 U is a control unit for the switch operation of spray nozzles for the suppression of dust in mining operations, in order to spray a mining area.

In DD 2 58 837 A1, a method and an arrangement for the creation of large-scale dust barriers are disclosed.

U.S. Pat. No. 479,979 A discloses a spraying apparatus.

Disclosed in DE 18 33 442 U is an "ambulant" transferable system for the sprinkling of agricultural areas.

DE 380 896 discloses an overhead sprinkler system with branch lines coming off a field line.

Disclosed in DE 19 28 789 C is an installation for the sprinkling of water or fertilizer in greenhouses.

Disclosed in U.S. 2014/0239080 A1 is an immovable installed overhead sprinkler system.

From "Technische Stroemungslehre [Technical Fluid Mechanics], Leopold Boeswirth, Text and Exercise Book, $8^{th}$ edition, Vieweg+Teubner, Chapter 12.3, it is known that, in the case of long pipelines through which liquid flows, the pressure on a slide which is opened or closed, may suddenly rise or fall sharply. It may even lead to vapor formation on the outflow side. Pressure shocks are reflected in the line system and lead to pressure oscillations. Such pressure shocks may considerably impair the life of apparatus with fluid-conveying lines.

To summarize, it may be stated that, for the binding of dust 1. an air/water mixture is often used to atomize the water for large-scale distribution 2. a fog or spray mist is provided as close as possible to the dust-originating point, in order to bind the dust, and 3. different dust binders, such as spray mist, fog, foam with and without chemical additives, are used.

A problem of the present invention is to create an apparatus and a method for the binding of dust, with which dust may be bound with great efficiency.

A further problem of the present invention is to create an apparatus and a method for the binding of dust, with which dust may be bound reliably with the least possible amount of binding agent.

A further problem of the present invention is to create an apparatus and a method for the binding of dust, wherein the apparatus and/or the apparatus used under this method is or are subject to minimal wear.

A further problem of the present invention is to create an apparatus and a method for the binding of dust, with which the escape of dust may be reliably prevented or considerably reduced along a large section or a large area, as for example a section of road or a gravel pit.

A further problem of the present invention is to create an apparatus and a method for the binding of dust which may be attached to or integrated with a wide variety of machines and vehicles, such as e.g. stone-crushers, track-laying machines, asphalt planers, cleaning vehicles, etc., wherein mobile operation is also possible.

One or more of the problems described here is or are solved by the subjects specified in the independent claims. Advantageous developments are set out in the relevant dependent claims.

The binding of dust may in principle be effected by an artificial fog or by a spray mist. In the case of an artificial fog, a fog which settles slowly on the ground is generated, with the dust being washed out of the air by the fog droplets. With the spray mist, the ground is wetted with binder, so that the emergence of dust is prevented. The fog formation and the spray mist differ mainly in droplet size, with the transition being fluid. The generation of a fog also leads to wetting of the ground and the generation of a spray mist also leads to dust being washed out of the air. However, in the case of an artificial fog, the main emphasis is on the effect in washing dust out of the air, while for spray mist it lies in the wetting of the ground. Artificial fog comprises droplets with a size of less than 200 µm, in particular less than 150 µm or less than 100 µm. Spray mist comprises droplets with a size of at least 100 µm, in particular at least 150 µm and preferably at least 200 µm.

In the case of an apparatus in which the ground is wetted with spray mist, preferably no more than 6 $l/m^2/h$ and preferably no more than 4 $l/m^2/h$ and in particular no more than 3 $l/m^2/h$ of binder are delivered. This ensures that no puddles occur. For sealed ground, the amount delivered should be set lower than for unsealed ground. The amount of binder delivered should be at least 0.75 $l/m^2/h$ and preferably at least 1 $l/m^2/h$ or in particular at least 1.2 $l/m^2/h$, to ensure adequate wetting of the ground. These values for the delivery of binder apply to continuous operation. For interval operation, the amounts delivered are correspondingly reduced by the pause times.

The apparatus variants described below for the control and directing of binder flows may be used for the generation of both fog and spray mist, unless expressly otherwise stated.

According to a first aspect of the present invention, an apparatus for the binding of dust is provided, comprising:

a binder reservoir, which provides liquid binder which is under pressure, a binder line which is connected to the binder reservoir, wherein there is connected to the binder line at least one spray nozzle which may be located in the vicinity of a dust source.

The spray nozzle is located in the vicinity of the dust source, and is preferably so designed and mounted that it is not the dust source which is sprayed with binder, but instead a binder fog is formed at a predetermined distance from the dust source. This arrangement is based on the knowledge that dust is swirled up at a dust source, while a dust source is generally linked to a turbulent airflow. If one wished to bind dust in such a turbulent airflow using a binder, then the binder requirement would be considerable. If on the other hand the dust is bound at points further from the dust source, at which the airflow has settled down, then the dust spends longer in the air and may be bound reliably with significantly fewer fog droplets than at the dust source itself. Even if a local dust source is surrounded by an artificial fog wall at a distance, the binder requirement is much lower than when the dust source is sprayed directly with binder, even though the area in which the fog is artificially formed is generally much greater than the dust source, since it surrounds the dust source at a predetermined distance.

The distance should be selected so that, in the area of the fog, the airflow containing the dust has calmed down sufficiently that the fog can sink slowly to the ground and is not moved away uncontrollably. Usually a distance of some 10 cm, preferably at least 50 cm or at least 1 m or at least 2 m is to be maintained. In choosing a suitable distance, external airflows should also be taken into account, such as may be created by movements of goods, vehicles, wind or thermal effects. Thermal effects often occur in sheds. It may be expedient to provide one or more baffles, by which an airflow contaminated with dust is so directed that it calms down and an artificial fog can remove the dust efficiently.

The distance from the dust source should preferably be chosen so that the fog occurs mainly in an area in which the airflow does not exceed 1 m/s, in particular does not exceed 0.8 m/s or does not exceed 0.7 m/s and preferably does not exceed 0.5 m/s. It has been found that, with an airflow greater than 1 m/s, the dust cannot be bound efficiently by a fog, or the amounts of water needed for efficient dust binding rise exponentially. The airflows may vary over place and time. In the unloading of large rocks, for example, a very strong airflow may occur temporarily, while in the pauses between the individual unloading operations, the airflow is significantly weaker. Short periods in which the limit values for maximum airflow are exceeded impair dust binding efficiency to only a limited extent. Baffles may be provided to keep extraneous airflows away from the fog zone, so as to maintain the limit values described above for the airflow in the area of the fog.

The binder is a liquid binder, preferably water. In the prior art, an air/water mixture is often used. Such an air/water mixture is however disadvantageous, since the air content generates a high inherent airflow, which is not suitable for the formation of a floating fog. An air/water mixture may be used to produce a spray mist wherein, however, water is preferred which is driven by a spray nozzle without air.

The binder is made available in the binder reservoir at a pressure of preferably maximum 10 bar, in particular preferably maximum 7 bar and in particular not more than 5 bar. The lower the pressure, the easier it is to design an apparatus with a long binder line, which permits wide-area coverage with spray mist. At higher pressure there is the risk that individual components, in the long term, will not withstand the loading, and the overall regulation and control of the pressure in the binder line will become significantly more expensive and more complex.

The binder reservoir should make the binder available at a pressure of at least 2 bar, preferably at least 3 bar and in particular preferably at least 4 bar. The higher the pressure in the binder reservoir, the greater the pressure losses in the binder line can be, while still providing an adequate pressure at the spray nozzle or nozzles. This also means that, the greater the pressure at the binder reservoir, the longer the binder line may be without needing an additional pressure stage in the form of a pump. The binder reservoir may be a well, a tank with or without a feed pump, or a connection to a water pipe, which provides the binder with water at a predetermined pressure.

The pressure under which the binder reservoir or a binder source is made available is preferably set by a pump. The pressure may however also be preset by an available water supply or an elevated tank which provide adequate pressure through a suitable geodetic difference in height, so that no extra pump is needed to convey the binder from the binder reservoir.

Limitation of pressure to a maximum value in the range of 5 to 10 bar also has the advantage that the binder line may be formed by a flexible tube, for example a plastic tube, in particular a PE tube. Such flexible tubes have considerable advantages since on the one hand they can buffer pressure, connection points for spray nozzles may be punched out at desired points, and in addition they can be laid very quickly and easily.

A further benefit from the limiting of pressure is that no high-pressure pumps, which are susceptible to polluted air, are necessary. High-pressure pumps are pumps which generate a continuous operating pressure of 20 bar or more.

The spray nozzle or nozzles are so designed that the binder is sprayed with a droplet size of 30 to 120 μm and preferably 50 to 150 μm and in particular with a droplet size of 60 to 90 μm. In calm air, such a droplet size forms a floating fog which reliably binds the dust and gradually sinks down.

According to a second aspect of the present invention, the binder line may extend over a distance of at least 100 m or in particular at least 300 m, with several spray nozzles connected to the binder line along this length, and wherein the apparatus is so designed that no more than 6 $l/m^2/h$ of binder is discharged onto the ground during a spraying operation.

The amount of sprayed binder is preferably set so that there is a minimal excess of moisture, i.e. not the whole of the sprayed binder is taken up by the air, but liquid fog particles are present in the air. Such fog particles sink, binding the dust contained in the air, and transporting it to the ground. Preferably the amount of water output is so large that an adequately strong downwards movement takes place, in order to transport the dust rapidly downwards. A certain excess of binder reduces the standard cost. It is however possible with such a droplet size to set the amount of sprayed binder so that on the one hand a stable floating fog is provided, and on the other hand the amount of binder is so small that no puddles occur on the ground. The apparatus units for producing artificial fog are preferably so designed that around 5 to 30 liters of binder are discharged per nozzle per hour, with the binder being distributed over an area of 0.8 m to 1.5 m around the nozzle. The spray nozzle or nozzles is or are preferably a pressure nozzle or nozzles, which is or are designed with an automatically closing or opening pressure control valve and therefore open automatically from a certain opening pressure of the fed binder upwards. The apparatus has a pressure control, by which the pressure in the binder line may be controlled. By this means it is possible to monitor via the pressure control whether the one or more spray nozzles are discharging binder or not.

In particular it is provided according to the first aspect that the binder line may have one or more pressure control valves, which, as pressure switching valves, open from a predetermined switching pressure upwards and thus release a binder feed to the spray nozzle(s), or, as pressure regulating valves, also open from a predetermined switching pressure upwards and at the same time regulate a pressure on the outflow side of the pressure regulating valve to a predetermined pressure range. The benefits of suitable pressure nozzles or suitable pressure control valves which, as pressure control valves, open from a predetermined switching pressure upwards and thus release a binder feed to the spray nozzle(s), or, as pressure regulating valves, also open from a predetermined switching pressure upwards and at the same time regulate a pressure on the outflow side of the pressure regulating valve to a predetermined pressure range, are indicated below and will be explained in more detail with the aid of a suitable embodiment.

The pressure nozzles or the pressure control valves may be designed for example with an opening pressure of 2 bar, 3 bar or 4 bar. The closing pressure is preferably somewhat less than the opening pressure. For an opening pressure of 2 bar, the closing pressure is for example 0.9 bar, for an opening pressure of 3 bar for example 1.5 bar, and for an opening pressure of 4 bar for example 1.8 bar. By this means it is ensured that, due to the pressure drop generated after opening of the respective pressure nozzle, the pressure nozzle does not immediately reclose, but instead can continue to be held open at a lower pressure.

Such pressure nozzles and pressure control valves respectively allow simple central control via the binder pressure, since the pressure control valves open and close completely when the pressure in the binder line is suitably controlled. Moreover, such automatically closing pressure nozzles and pressure control valves prevent draining of the binder line, since, in the event of a pressure drop, they close automatically under the switching pressure. By this means, the pressure in the binder line does not fall, or perhaps only very slowly so that, with pulses at intervals, no or only very slight pressure must be built up in the binder line. These pressure nozzles therefore function also as run-out stops. This provides the following benefits:

The binder line need not be filled, before fresh water is discharged through the spray nozzles. Between individual pulses, however, a small amount of binder must be fed in. Due to the pressurized binder reservoir, this binder is suddenly made available and already under pressure. This makes possible rapid pulsing with a minimal amount of discharge.

Pressurized water is therefore always available directly at the spray nozzles or the adjacent pressure nozzles or pressure control valves.

Refilling of the binder line is subject to the risk of pressure shocks and cavitation in the line and nozzles and other components such as pumps, valves, etc. There is also the risk of sucking in unclean ambient air or polluted drainage water or other dirt. This risk is avoided or at least reduced.

The pressure nozzles may be designed with integral pressure valves with a predetermined opening and a predetermined closing pressure. The pressure nozzles may however also be formed by a nozzle and a separate upstream pressure valve.

The pressure nozzles preferably have a diaphragm which is acted on by a piston pre-loaded by a spring, so that passage through the pressure nozzle is opened only from a predetermined opening pressure onwards and is closed again when the closing pressure is reached. The pressure nozzles are preferably set so that, in the whole of the dust binder apparatus or in certain sections in which substantially identical spray nozzles are preset, they provide a pressure to the respective spray nozzles, which varies by a maximum of 20% and in particular a maximum of 10%. Such an even pressurization results in an even output of binder, wherein the uniformity here relates both to the geometry of the respective spray cone of the individual spray nozzles and also to the amount of binder discharged. It is especially expedient to provide roughly the same pressure in sections of the dust binder apparatus in which the identical nozzles are located. Naturally, differently configured sections, such as, for example, sections in which standing nozzles are provided for wetting the ground, may be provided with a different pressure to, for example, sections with suspended nozzles for creating a fog, and accordingly with pressure nozzles which are otherwise set or otherwise designed or with otherwise designed pressure control valves.

Output of binder at differing levels of intensity is set preferably by the spacing of consecutive spray nozzles and not by differences in pressure. The spray nozzles are preferably so designed that they spray out the binder with a circular or semi-circular throwing cone. The spacing of two consecutive nozzles amounts preferably to the diameter D of the circle of the relevant throwing cone less at least 20% (corresponding to 0.8 D) and in particular at least 34% (corresponding to 0.66 D) of this diameter. By this means a roughly strip-shaped area is evenly covered with binder, wherein the overlapping sections of adjacent throwing cones are limited. Preferably the spacing of adjacent nozzles lies in the range of the diameter of the throwing cone less at least 45% and preferably at least 50% of the diameter. In the case of semi-circular throwing cones, the closer spacing of the nozzles with at least 45% deduction from the diameter is preferred. Dust binder apparatus units which create fog generally have a nozzle arrangement with maximum intervals of 0.55 D or 0.5 D.

The pressure control has preferably a control valve which is located in the binder line in the area between the binder reservoir and the pressure nozzle or nozzles, wherein the control valve may be operated by a control unit. By this means the spray nozzle or nozzles may be fed specifically with binder at a predetermined pressure. It is also possible to provide several control valves, each downstream of one or more spray nozzles, which are then supplied with binder at a predetermined pressure by means of the respective control valve in each case. The control valves may be driven by the control unit by hydraulic, pneumatic or electrical or mechanical means.

The spray nozzle or nozzles may also be provided with a valve operable directly by a control unit. The apparatus may also include spray nozzles in the form of pressure nozzles and spray nozzles provided with a directly operable valve. Such directly operable valves may be opened and closed remotely by the control unit.

The binder reservoir or a pressure reservoir may include a pressure vessel with gas cushion. Such a pressure vessel with gas cushion may be in the form of a diaphragm vessel which has a diaphragm dividing the diaphragm vessel into a gas pressure chamber and a binder chamber. The pressure vessel may also be a wind vessel in which there is a gas bubble which is in direct contact with the binder. Since gas may be compressed, binder may be taken up in the pressure vessel with gas cushion, wherein the gas is compressed in the gas pressure chamber, so that the binder is stored with increasing pressure in the pressure vessel with gas cushion. With one or more such pressure vessels with gas cushion, dynamic variations in pressure may be reduced. Such dynamic pressure changes occur due to variations in flow rate on account of the inertia of the liquid. Such changes are unavoidable as a result of start-up and shutdown or switch-off processes. In particular the rapid change in throughflow and therefore of velocity in a pressure line, for example through fast closing or opening of shut-off devices or through sudden pump stoppage, generates pressure shocks in the lines. Pressure then swings up and down around the initial pressure. At the end of the line the pressure wave is reflected, returns to the starting point as a negative wave, and dies away gradually in multiple to-and-fro movements. As a result of partial vacuum, this may even lead to breaking off of the water column. The resultant collision of the two independently oscillating flows leads to especially dangerous pressure shocks. In principle, opening and closing times of shutoff devices may be extended, so that the change in velocity takes place harmlessly. There are however unavoidable operational events such as sudden pump stoppage or power failure or an emergency stop. With the pressure vessel with gas cushion, such pressure shocks may be reduced, since, for example, in the event of a sudden closing of a shutdown device, the pressure vessel with gas cushion continues to accept binder, so long as it is located in the flow direction upstream of the shutdown device, and a gradual rise in pressure in the binder line occurs. With a sudden failure of a pump, the pressure vessel with gas cushion supplies further binder, so that the liquid column formed by the binder is not stopped abruptly. If, moreover, a pressure vessel with gas cushion is fitted before the pump or at the pump inlet, this vessel may be used as additional protection for the pump or the upstream hydraulic elements, since it can equalize feed fluctuations and dampen pressure shocks. The binder feed to this pump must stand below a certain pressure, since otherwise the pressure vessel would become empty.

The apparatus may also have several pressure vessels with gas cushion. The pressure vessels with gas cushion may be arranged distributed along the binder line. The volume of the pressure vessel or vessels with gas cushion may amount to at least 300 l, preferably at least 1,000 l, in particular at least 5,000 l and preferably at least 10,000 l or several 10,000 l. The volume of the pressure vessel with gas cushion comprises both the volume of the gas pressure chamber and also the volume of the binder chamber. The binder chamber generally amounts to around 20% to 50% of the total volume of the pressure vessel. In the normal state of the apparatus, the pressure in the gas pressure chamber should be around 0.5 to 0.9 times the operating pressure or a start-up pressure of a delivery pump.

Especially preferred is for one or more pressure vessels with gas cushion to be used with a dust binding apparatus which idles during standstill or pause periods. These are in particular dust binding apparatus units which have no or only few self-locking pressure control valves which act as anti-overflow devices. During a stoppage or a pause, the lines of this dust binding apparatus empty partly or completely. On resumption of operation, the lines are first filled with binder. Here, the property of the pressure vessel with gas cushion is advantageous since it first delivers binder rapidly into the line at high pressure while, owing to the expansion of the gas cushion, the pressure in the pressure vessel decreases, causing the delivery pressure to reduce accordingly. With almost complete filling of the lines there is then a reduced pressure, thereby reducing the problem of pressure shock.

In a dust binding apparatus it is possible to provide different sections, which drain at different rates during a stoppage. The individual sections may each be provided with a separate pressure vessel, if this is expedient. Especially the sections which drain quickly are preferably provided with a pressure vessel, so that they may be rapidly refilled once again.

The pressure vessel with gas cushion preferably has a feed line for filling the pressure vessel with gas cushion and a discharge line for draining the pressure vessel with gas cushion, wherein the feed line has a narrower cross-section than the discharge line, so that filling of the pressure vessel with gas cushion takes place at a slower rate than emptying of the pressure vessel with gas cushion. By this means it is possible for pressure peaks, resulting from rapid braking of the binder in the pipeline, to be absorbed gradually, distributed over a longer period of time. The slow filling of the pressure vessel with gas cushion therefore leads to a gradual braking of the binder fluid column. Such a design of the pressure vessel with gas cushion is also suitable for reliably capturing downwards directed flows. On the other hand, in the event of a pump failure, a large binder flow can be provided very quickly, so that a corresponding pressure shock is avoided. In addition, through various mechanisms and/or depending on the respectively prevailing operating pressures, both the duration of filling of the pressure vessel or vessels with gas cushion, and also the duration of emptying, may be influenced.

Instead of or in combination with the cross-section narrowing, another flow resistance may be provided in the feed line. The flow resistance may be for example in the form of a pressure reducer, a pressure plate or a difference in height. If the pressure vessel with gas cushion is located a short distance above the binder line, preferably several meters above the binder line, then the binder must be conveyed upwards against the force of gravity to fill the pressure vessel with gas cushion, and on draining the pressure vessel with gas cushion may be conveyed quickly into the binder line due to the force of gravity. If the delay in filling and the acceleration on draining are effected solely due to such a difference in height, then the feed line and the discharge line may be in the form of a common pipe run. In using such a height difference it is expedient if the cross-section of the feed line and the discharge line is large, so that the liquid wave leading from the binder line to the pressure vessel with gas cushion has a high weight.

As already explained above, automatically closing pressure nozzles which act as run-out stops allow interval operation, since water under pressure is always directly present at the spray nozzles or the pressure nozzles adjacent to the former. Also advantageous for interval operation is the provision of one or more pressure vessels, since draining is often not completely prevented even with automatically closing pressure nozzles. The automatically closing pressure nozzles frequently lead to very slow draining, so that refilling at the start of a spray interval may be effected very quickly by means of a pressure vessel with gas cushion.

This use of automatically closing pressure nozzles or the use of automatically closing control valves in conjunction with one or more pressure vessels effects very short reaction times for the spraying of binder after a spray pause. The reaction time is measured after a pause of at least 5 min from switching on a pump or opening a valve, so that a section in which spray nozzles are located is supplied with binder which is under pressure until the point in time at which all nozzles supplied with binder through switching on the pump or opening the valve are discharging binder. With prototypes, reaction times of just a few seconds have been obtained, even when the section was longer than 100 m. Dust binding apparatus units for producing fog are preferably so designed that their reaction time does not exceed 10 s and in particular is no greater than 5 s, while dust binding apparatus units for wetting the ground are preferably so designed that their reaction time is no greater than 2 min and in particular no greater than 1 min and preferably does not exceed 30 s. Such short reaction times may be achieved even with large dust binding apparatus units with sections with a length of more than 100 m and in particular more than 300 m.

Also required for interval operation are flexible lines, which can also store binder under pressure.

The apparatus preferably has a pump, which pumps the binder. A pressure switch which may be connected to the binder line switches on the pump at the start-up time, when a predetermined start-up pressure has been undershot. In this way, a predetermined minimum pressure is maintained in the binder line automatically.

Several pressure switches may also be used, being assigned different functions or having different start-up pressures. These functions are for example:

Pressure switch 1: switch pump on/off

Pressure switch 2: monitor excess pressure

Pressure switch 3: monitor under-pressure (such as may occur e.g. during dry running)

Pressure switch 4: line end pressure monitoring: if at the end of the line there is no pressure or too little pressure, this may suggest a line breakage or a blockage; or also checking whether a desired pipeline pressure reduction (e.g. before a pump stop) has already reached the end.

Pressure switch 5: monitor suction line for correct under-pressure value. This is an indicator that the pump is sucking in, and also an indicator of whether or not the suction force of the pump is in the right direction (avoidance of cavitation), or an indicator of a suction line blockage or a suction line pre-filter.

Pressure switch 6: gas pressure monitoring of the pressure vessel with gas cushion.

Pressure switch 7: pressure vessel filling status. Only when, in continuous operation, the pressure in the pressure vessel or in its feed line or the main line is roughly constant, can a full pressure vessel be assumed. May be used e.g. to reach a decision as to whether a pump may already be switched off or should run on, in order to buffer in the pressure vessel.

Pressure switches 8 and 9: pressure difference evaluation, pre-/post-filter pressure. To monitor filter status, whether this e.g. is producing too much loss of pressure due to dirt accumulation and requires cleaning. An automated filter cleaning process may be started or also just a report made that the pressure difference is too large and that cleaning should take place.

These pressure switches need not all be constantly active; they may also be "conditioned". E.g. the under-pressure switch is used only during continuous pump operation to monitor possible under-pressure.

The pressure switches may also be equipped with two switching points (lower and upper), in order to create certain hystereses which allow the system to run more stably and more quietly, since not every small change in status leads immediately to a switching process, but instead a certain threshold must first be exceeded. In this way the system runs more stably and does not start to cycle or oscillate. In addition, the pressure switches may be coupled to timers (e.g. time relays) so that, on reaching a switching point, first only the timer is activated and, only after the stored time has elapsed does the switching process become effective.

The pressure switches may either trigger direct processes or also act simply as detectors. For checking the correct function, visual pressure indicators may also be fitted or connected temporarily in the vicinity of the pressure switches, e.g. pressure gauges or remotely transmitting pressure transmitters.

The pressure switch may also be so designed that, on exceeding a predetermined switch-off pressure, the switch-off time, the pump switches off and/or an emergency release valve opens. A flow meter may also be connected to the binder line in such a way that, if the flow rate falls below a predetermined minimum level, the pump switches off and/or an emergency release valve is opened. In this way it is ensured automatically that the pressure in the binder line does not rise too much.

With a target value or other flow measuring device it is also possible to determine an excessively large flow (=abnormal operating status, e.g. line breakage). Expediently, this flow measurement is time-based, i.e. only after a certain stabilization phase after start-up of the unit (during the start-up phase, for example, abnormal conditions may prevail for a short time) does the measured value of the flow sensor apply. This may also be coupled to the condition that, for example, the flow rate overshoot is maintained for a certain minimum period of time.

A switch-off delay device may be provided, which allows the pump to be switched off only after the expiry of a predetermined delay time interval, wherein the delay time interval starts with the switch-on time or the switch-off time or a point in time between the switch-on time and the switch-off time. Such a switch-off delay device prevents short-term pressure or volume fluctuations leading to shut-down of the pump, which would lead to further variations in pressure. The change in state, i.e. the pressure drop or the reduction in flow must therefore last for a certain period of time before the pump is switched. The delay time interval is preferably at least 5 seconds, preferably at least 15 seconds and in particular at least 30 seconds.

An overpressure pressure switch may be connected to the binder line and switches off the pump and/or opens an emergency release valve on detecting a certain overpressure which exceeds the switch-of pressure. The switching on account of detection of overpressure by means of the overpressure switch overrides preferably all other control processes such as, for example, not switching off due to a continuing delay time interval. In addition, signaling/an alarm indication/initiation of alarm response measures such as e.g. additional disconnection of the binder feed may be effected.

The apparatus is preferably designed so that the flow velocity of the binder in the lines does not exceed 5 m/s and is preferably no greater than 3 m/s. The greater the flow velocity, the greater the pressure losses. The pressure losses are proportional to the square of the flow velocity. In practice these upper limits have proved to be very advantageous, since, at these flow rates, it is possible to supply several spray nozzles reliably over a long section (e.g. 1 to 5 km) with sensible line cross-sections. At higher flow rates, problems with pressure shocks may arise.

The binder line may have a main run, and a secondary run, running parallel to the main run and with a smaller cross-section, wherein the secondary run joins the main run at both ends, and a flow meter is provided in the secondary run. The throughflow measured in the secondary run is proportional to the throughflow in the main run or main flow, therefore making possible the deduction of the overall volumetric flow through the main run and the secondary run. Measurement of the lower volumetric flow in the secondary run is much simpler than measuring the much greater volumetric flow in the main run.

The flow meter may be so designed that it measures the flow indirectly with the aid of the temperature of the binder in the pump or in the direction of flow shortly after the pump and/or with the aid of the current consumption of the pump and/or with the aid of the pressure difference before/after the pump, and/or with the aid of the pressure before the pump and/or with the aid of the pressure after the pump and/or with the aid of the acoustics of the pump and/or with the aid of the current power consumption of the pump shaft. Since the pump generates heat and the binder is often provided from a cool reservoir, such as, for example, a well, a conclusion may be reached, with the aid of the temperature of the binder in the pump or in the flow direction shortly after the pump, as to the volumetric flow of the binder in the binder line or in the pump.

The binder line may be provided with a venting device, which expels air bubbles from the binder line to the outside. Such air bubbles may occur through outgassing of the binder due to pressure variations. The venting device may be a passive vent valve which is permeable to gas and impermeable to liquids. The venting device may also be a switchable valve, located in the binder line. If a gas bubble is present, the switchable valve is opened by a control device. The presence of a gas bubble may be detected by the control device on the basis of certain operating states and/or by means of a sensor. The predetermined operating states detectable by the control device are, for example, a stoppage of delivery or a low pump load on start-up. Gas bubbles may be determined by means of temperature sensors or pressure sensors or ultrasound sensors or a magnetic inductive sensor or an X-ray unit or a microphone. In particular, in monitoring pressure development on start-up of the pump, a slow rise in pressure may be evaluated as binder containing gas bubbles in the binder line.

The venting device is preferably fitted at local high points and points with volume flow changes, such as, for example, sharp-edged openings, pressure reducers, cross-section constrictions, at which air bubbles may collect. Preferably a venting device with a switchable valve is combined with a venting device with a passive vent valve, wherein, on starting up the apparatus, first the switchable valve is used to vent larger amounts of air, and during normal operation, venting is effected solely or overwhelmingly by the passive vent valve.

The binder line may have one or more pressure control valves, which, as pressure switching valves, open from a predetermined switching pressure onwards and thereby release a binder feed at the spray nozzle(s), or, as pressure regulating valves, also open from a predetermined switching pressure onwards and at the same time regulate a pressure on the outflow side of the pressure regulating valve to a predetermined pressure range. Such pressure control valves then have the additional function of a pressure reducer. With one or more such pressure control valves, the binder line may be divided into different pressure zones. These pressure control valves preferably have different switching pressures. In particular, the pressure control valves are so arranged in the binder line that pressure zones are formed with pressure which reduces with distance from the binder reservoir.

The several pressure control valves may be fitted in a main run of the binder line, so that the main run is also divided into several pressure zones.

One or more pressure control valves may be provided in a branch run of the binder line branching off the main run, so that the respective branch run is closed if there is an undershoot of the switching pressure. This avoids the main run becoming empty, and the respective pressure control valve is assigned to one or more spray nozzles located in the branch run.

Due to the provision of one or more pressure control valves, pressure variations in the binder line may be controlled and monitored in a targeted manner. Such pressure variations may be caused by height differences along the binder line, long line lengths and a resultant drop in pressure, temperature variations in the binder line, or pressure fluctuations due to switching processes. With the pressure control valves, emptying of the binder line, in particular the main run of the binder line, may be prevented, so that a rapid start-up after a halt in operations is possible since at least the main run of the binder line is already filled with binder. In this way, pressure shocks are also avoided or reduced. The pressure control valves may also be integrated in spray nozzles or fitted in combination with them. Such spray nozzles close automatically below a predetermined closing pressure, so that emptying of the binder line in the area of the spray nozzles is avoided. The spray nozzles are often located in branch runs. The pressure control valves close, preferably automatically, if a predetermined closing pressure is undershot, so that they may automatically isolate individual zones of the binder line. Such pressure control valves function as run-out stops, to prevent emptying of the binder line.

To create zones with different pressure, pressure reducers may also be used instead of pressure control valves and are located in the appropriate lines.

Such pressure reducers may also be assigned to or integrated with individual spray nozzles. Such a pressure reducer lowers the pressure to a predetermined reduced pressure level. By this means it is ensured that the binder is present at the spray nozzle with the constant reduced pressure so long as, in the area before the pressure reducer, the binder is present at an essentially desired but higher pressure. The pressure in the line may therefore fluctuate and nevertheless the binder is present at the spray nozzle concerned with a predetermined pressure, and a predetermined amount of binder plus a predetermined spray profile is output by the nozzle.

Such a pressure reducer may respectively be assigned to an individual spray nozzle or to a group of several spray nozzles.

The binder line is preferably designed with an elasticity for the elastic buffering of binder with an elasticity volume of 1 per mille and preferably at least 1% of the total volume of the binder line on the basis of pipe wall elasticity and/or at least one gas pocket and/or a pressure vessel with gas cushion. Preferably this elasticity volume is at least 2% or at least 5% of the total volume of the binder line. On account of this elasticity, pressure fluctuations in the binder line may be balanced out without generating pressure shocks, or the effects of pressure shocks may be reduced. In order to provide pipe wall elasticity, plastic pipes, in particular PE pipes, made in particular of flexible polyethylene, are used for binder line. The inside diameter of the pipes amounts preferably to at least 16 mm. The binder line has preferably a length of at least 100 m. It may be several kilometers long. The binder line is preferably divided by the above-mentioned pressure control valves into zones or sections with a length of 100 m to 600 m, preferably 250 to 500 m. Such zones of flexible pipes offer sufficient elasticity to dampen pressure peaks occurring on the closure of shut-off devices, which include valves and nozzles, in such a way that they cause no damage. The PE pipes may also be made of rigid polyethylene. In pipes of flexible polyethylene, it is easy to punch holes for nozzles or branch lines.

Preferably the maximum elasticity of the binder line is 10% and in particular a maximum of 5% of the total volume of the binder line. Too much elasticity causes inertia in response behavior and may result in it not being possible to deliver the binder in short pulses in a targeted manner.

The binder line may have a main run in which a pressure reducer is located, with a secondary run parallel to the main run and in which there is a non-return valve which opens against the flow direction of the pressure reducer. Depending on the principle of design, a pressure reducer also acts as non-return valve, so that a pressure peak which occurs on the pressure-reduced side of the pressure reducer cannot escape from the pressure-reduced zone due to the pressure reducer. Through the provision of the secondary run with non-return valve, which opens against the direction of flow of the pressure reducer, such a pressure peak may escape from the pressure-reduced zone through the secondary run, so that here again the pressure reduced by the pressure reducer may cease. The secondary run preferably has a smaller diameter than the main run.

Preferably the binder line has flexible branch lines which are connected to a common line run or line section, wherein, at the end of the branch lines furthest away from the line section or line run, in each case a spray nozzle is provided. Owing to the weight of the spray nozzle or an additional weight provided on it, the relevant branch line automatically aligns itself vertically. In this way the flexible branch line positions and adjusts itself even when the whole dust binding apparatus is moved on account of external factors such as, for example, wind. Such a dust binding apparatus may be designed both for producing artificial fog and also for wetting the ground.

According to a third aspect of the present invention, the binder line may be suspended from a bearer cable and the binder line made flexible, wherein the binder line is arranged roughly parallel to the bearer cable, to which it is fastened at several points.

The binder line, with or without flexible branch lines, may be fastened suspended from a cable with suitable pipeline hooks. Such an arrangement may be installed very easily and quickly over long sections. For this purpose a thin bearer cable is adequate, in particular a steel cable which is stretched over a certain distance and from which the binder line is suspended by means of the pipeline hooks. Preferably the binder line is made of a plastic material, in which holes may be punched for connection of the branch lines. This punching of the holes is also possible after suspension of the binder line from the bearer cable.

The spray nozzles may be arranged along the binder line at intervals of no more than 10 m, preferably no more than 8 m and in particular no more than 7 m.

The spray nozzles for spraying out the binder may be designed with a circular or circular-segment-shaped spray cone, with the maximum distance between two adjacent spray nozzles not exceeding 80% of the diameter of this circle.

The binder line may be provided with at least one filling rate control valve, which, with the aid of a detected volumetric flow of the binder medium, opens a passage for the binder in roughly inverse proportion to the volumetric flow; this means that the lower the volumetric flow, the more the filling rate control valve is opened. With a low volumetric flow, the passage is completely opened. With a high volumetric flow, it may be completely closed or closed to the extent that a previously determined volumetric flow is not exceeded. By this means it is ensured that a pump is not operated outside its QH characteristic (=volumetric flow-height characteristic). It may also be ensured by this means that, on refilling a binder line, the volumetric flow is initially limited so that, while expelling the air present in the binder line, no excessive pulses build up which, at the end of the refilling process, would cause a correspondingly high pressure shock; the slow filling is therefore an additional function of this valve.

The volumetric flow may be determined with the aid of the pressure difference in the direction of flow before and after the filling rate control valve and/or the filling rate control valve may additionally be controlled by a control unit, wherein the desired volumetric flow may be set.

The binder line may be provided with at least one filling control valve, which, with the aid of a detected filling state of the binder line, opens a passage roughly proportional to the filling state. This filling control valve acts in a similar manner to the filling rate control valve described above and prevents too high a volumetric flow on refilling, which would cause a high pressure shock at the end of the refilling process.

The filling control valve may be designed with two opening stages, wherein, if the filling level is low the passage is opened only slightly, and with a high filling level the passage is opened completely. The filling control valve may also be opened or closed continuously.

The binder line may have a pressure retention valve, which, with the aid of a pressure detected in the binder line in the flow direction before the pressure retention valve, opens roughly in proportion to the pressure. By this means, the pressure in the flow direction before the pressure retention valve is held roughly constant, since, if there is a reduction in the detected pressure, the pressure retention valve closes slightly so that, due to the backup, the pressure in the flow direction before the pressure retention valve rises again. The pressure retention valve is preferably located in a main run of the binder line.

The binder line has a main run and a branch run which branches off from the main run. A control valve is provided in the branch run.

The control valve may be in the form of a pressure relief valve which opens roughly in proportion to the pressure in the main run. If the pressure in the main run rises above a predetermined pressure, this leads to diversion of the binder over the branch run. The binder may be discharged via spray nozzles or over an empty line. In this way it is ensured that there is no undesired high pressure in the main run. The pressure relief valve may open only after a predetermined minimum pressure is reached in the main run.

The control valve in the branch run may also be in the form of a quick drain valve, which, after a predetermined minimum pressure is reached in the main run, substantially opens fully, so that a rapid rise in pressure in the main run may be counteracted. After the pressure in the main run has fallen, the quick drain valve is able to close more slowly than it opened, so that a slow build-up of pressure in the main run is once more possible.

The binder line may be connected to a well pipe which leads downwards from the binder line into the underground well. A pump is fitted in the well pipe, and the control valve in the branch run is so controlled that, when the pump is switched on, the control valve is gradually closed over a predetermined interval of time and/or is gradually opened over a further predetermined interval of time when the pump is switched off. In the case of such well pipes, binder and water respectively are delivered in large quantities. The pump is generally fitted deep underground, resulting in the formation of a high water column. The risk of pressure shocks is high. Through the gradual closing of the control valve when the pump is switched on, the channeling of the binder through the branch line is gradually reduced, by which means the pressure in the binder line is gradually increased. On switching off the pump, the control valve is gradually opened, so that the pressure in the binder line is gradually reduced and a pressure shock is prevented. The opening of the control valve preferably takes place shortly before the pump is switched off so that, when the pump is switched off, there is already reduced pressure in the binder line.

The binder line may have a control valve which is controlled by a control device in such a way that it opens slowly over a predetermined interval of time with the switching-on of the pump and/or is closed when the pump is switched off. With this control valve, pressure shocks when the pump is switched on and off are reduced. The control valve may be in the form of a non-return valve which prevents a flow back into or through the pump.

The control device of the control valve may also be designed to control the pump, so that switching-on and off of the pump is effected synchronously with switching of the valve.

Preferably a control device is provided, which, depending on the filling state of the binder line, the filling level of the pressure vessel with gas cushion and/or the volumetric flow in the binder line, controls the supply of binder from the pressure vessel with gas cushion into the binder line. This control device is preferably so designed that, with a low state of filling of the binder line, binder is withdrawn from the pressure vessel with gas cushion at a high volumetric flow rate, in order to fill the binder line as quickly as possible, while on reaching a higher filling state the flow of binder is reduced or stopped, so as to avoid a pressure shock. Initially, binder may be fed to the binder line by the pressure vessel with gas cushion and the pump acting together. As the filling state increases, the supply from the pressure vessel with gas cushion is reduced or stopped completely, and the delivery rate of the pump is suitably adjusted and preferably reduced.

The filling state of the pressure vessel with gas cushion may be determined from the gas pressure, the binder pressure, by means of an ultrasonic sensor or a volumetric flow measurement. The volumetric flow measurement may be made using a flow meter as described above. Several pressure vessels with gas cushion may also be provided.

In the binder line it is possible to provide one or more cyclone filters with a flush inflow line and a flush outflow line with a flush outflow valve so that, when a binder flow is stopped by the cyclone filter, it is possible to flush the cyclone filter without having to drain the other central areas of the binder line. A pressure vessel with gas cushion and/or an external water pressure port may be connected to the flush inflow line. The cyclone filter may then be installed in a suction line and flushed during operation of the pump. The suction line is a line section located before a pump in the direction of flow. With the fitting of a filter in the suction line it is ensured that the binder is filtered before it reaches the pump. By this means the operating life of the pump may be extended. To flush the cyclone filter, either the pump is stopped and flushing medium is fed through the flush inflow line from the pressure vessel or from the external water pressure port or, to flush in the case of suction-side installation of the cyclone filter, the binder flow through the cyclone filter is stopped and the cyclone filter is back-flushed.

With conventional apparatus for the avoidance of dust, large amounts of water are discharged locally, and then distributed by vehicles over a wide area. Such distribution is often essential, in the case of known systems, for the success of dust avoidance. With the invention, on the other hand, binder may be evenly and automatically distributed over large areas. Provision for distribution e.g. by vehicles is here unnecessary, since the invention is self-distributing in operation or has a self-distribution system.

The dust binding apparatus systems described above may be used for the binding of dust, wherein the individual aspects may be applied separately or in combination.

Such a dust binding apparatus may be used to generate artificial fog, in which case the dust is bound in the air.

A dust binding apparatus may also be used for wetting the ground, in which case the dust is bound on the ground and can no longer be swirled up into the air.

In such a method for the binding of dust, the binder is preferably delivered at intervals with spraying phases and pause phases.

For wetting the ground, the spraying phases and the pause phases are at least 2 minutes or 5 minutes, preferably at least 10 minutes. The spraying phases preferably last no longer than one hour and in particular no longer than 30 minutes. The pause phases may last for roughly the same length of time as the spraying phases. The pause phases may however also be longer and in particular a multiple of the spraying phases.

In creating an artificial fog, the duration of the spraying phases and the pause phases should preferably be no longer than 120 seconds and in particular no more than 30 seconds. The duration of the spraying phases and the pause phases may be a few seconds. For creating an artificial fog the spraying phases are preferably longer than the pause phases. The pause phases are made short enough that no or only very small gaps occur between consecutive clouds of fog. The slower the airflow in which the artificial fog or clouds of artificial fog exist, the longer the pause phases can be. The larger the fog droplets are, the faster they sink so that the corresponding pause phases may be made shorter. With a droplet size of around 100 µm to 200 µm, the pause phases are preferably no longer than 5 seconds. In a fog in which the droplets overwhelmingly have a size of less than 100 µm, the pause phases may also be set to be longer. If it is desired to use as little binder as possible, e.g. to avoid water-logging the ground, it is also possible to make the spraying phases as short as possible and to extend the pause phases. This must be determined empirically.

With the dust binding apparatus systems described above it is even possible to set and to operate very short pause phases of 1 to 3 seconds. For such a rapidly switching interval operation the measures explained above, such as flexible storage capacity in a pressure vessel or in flexible lines and/or the provision of pressure control valves in or close to the spray nozzles, are of benefit, since by this means, even with a run with a length of at least 50 meters and in particular at least 200 meters, such interval operation is possible.

For creating an artificial fog, the spraying phase is preferably longer than the pause phase. The spraying phase may in particular be twice as long as the pause phase or a multiple thereof.

To avoid the formation of puddles, the dust binding apparatus is so operated that the binder is applied at a rate of no more than 6 l/m$^2$h and preferably no more than 4 l/m$^2$h and preferably no more than 3 l/m$^2$h. If the binder is sealed, then these spraying rates are even lower, amounting preferably to no more than 1.2 l/m$^2$h or no more than 1 l/m$^2$h and preferably no more than 0.8 l/m$^2$h.

The dust binding apparatus for the creation of an artificial fog is preferably so operated that the binder is sprayed in an area which is so far from the dust source that, in this area, the airflow is no greater than 1 m/s, in particular no greater than 0.8 m/s and preferably does not exceed 0.7 m/s. It is especially advantageous when the airflow is no greater than 0.5 m/s.

Figure 2:
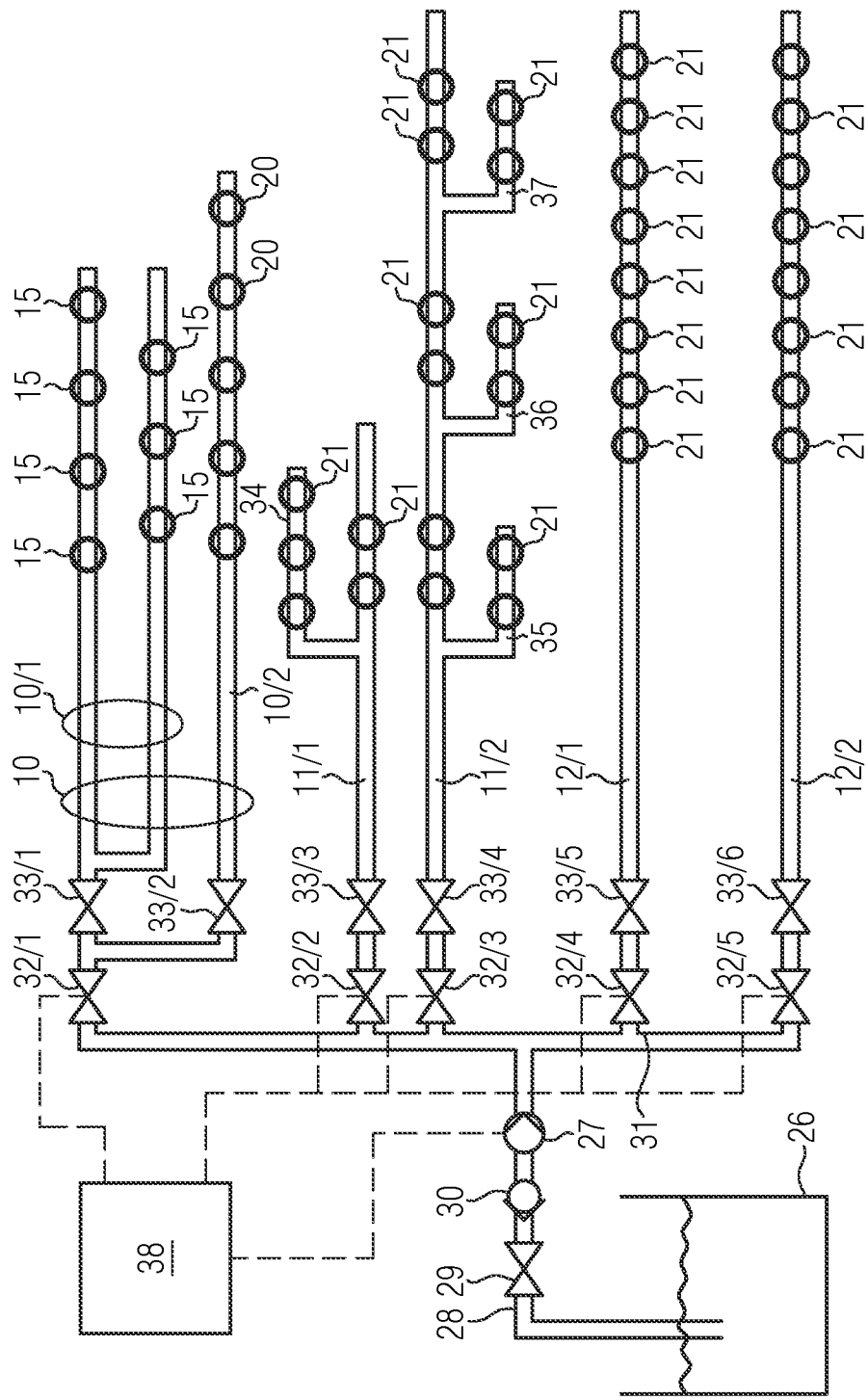

The invention is explained below by way of example with the aid of the appended drawings, which show schematically in:

FIG. 1 an open-cast working with an apparatus for the binder of dust, in a plan view FIG. 2 a line plan of the apparatus for the binding of dust of FIG. 1

Figure 3:
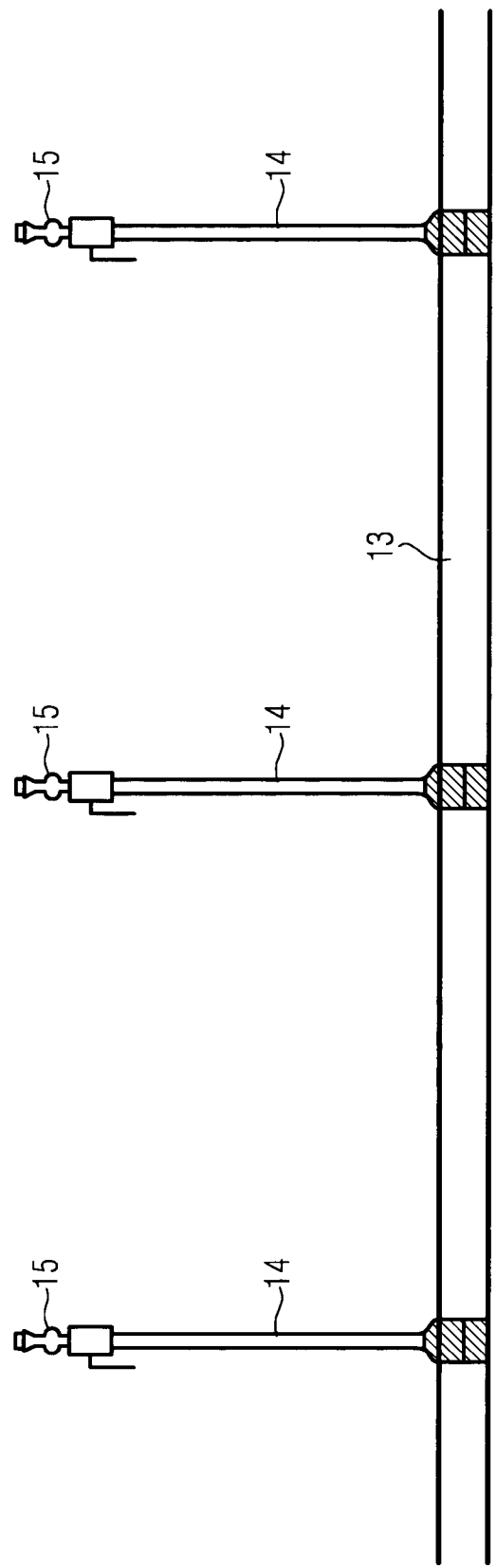

FIG. 3 a standing arrangement of spray nozzles in a side view

Figure 4:
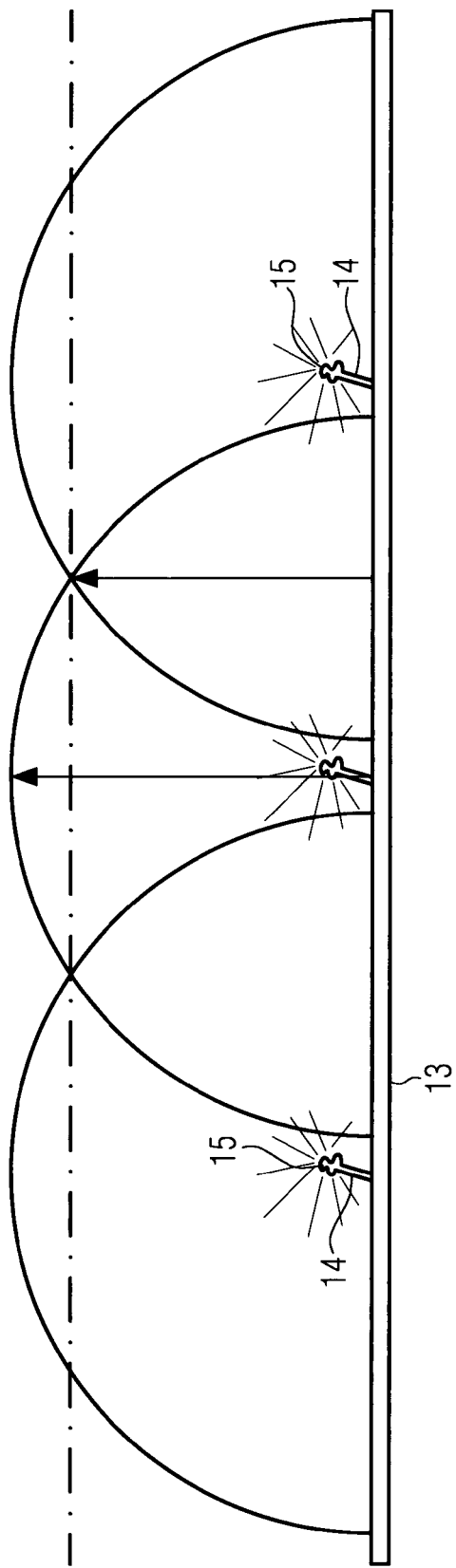

FIG. 4 a spraying area of the nozzles of FIG. 3

Figure 5:
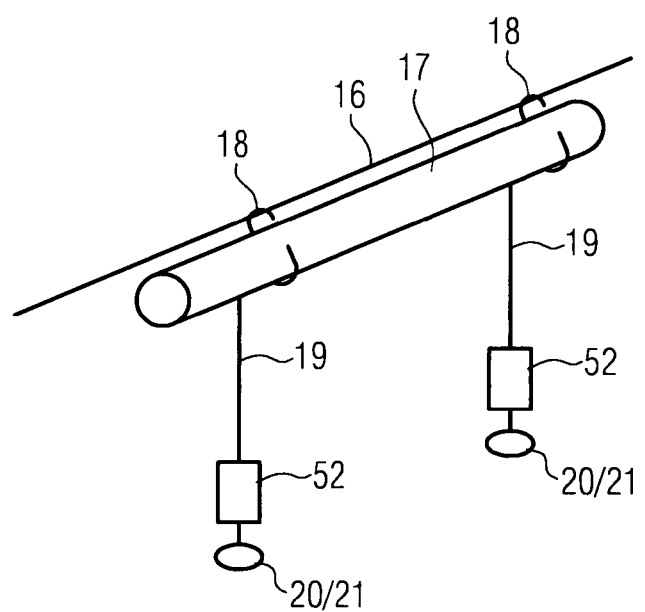
Figure 6:
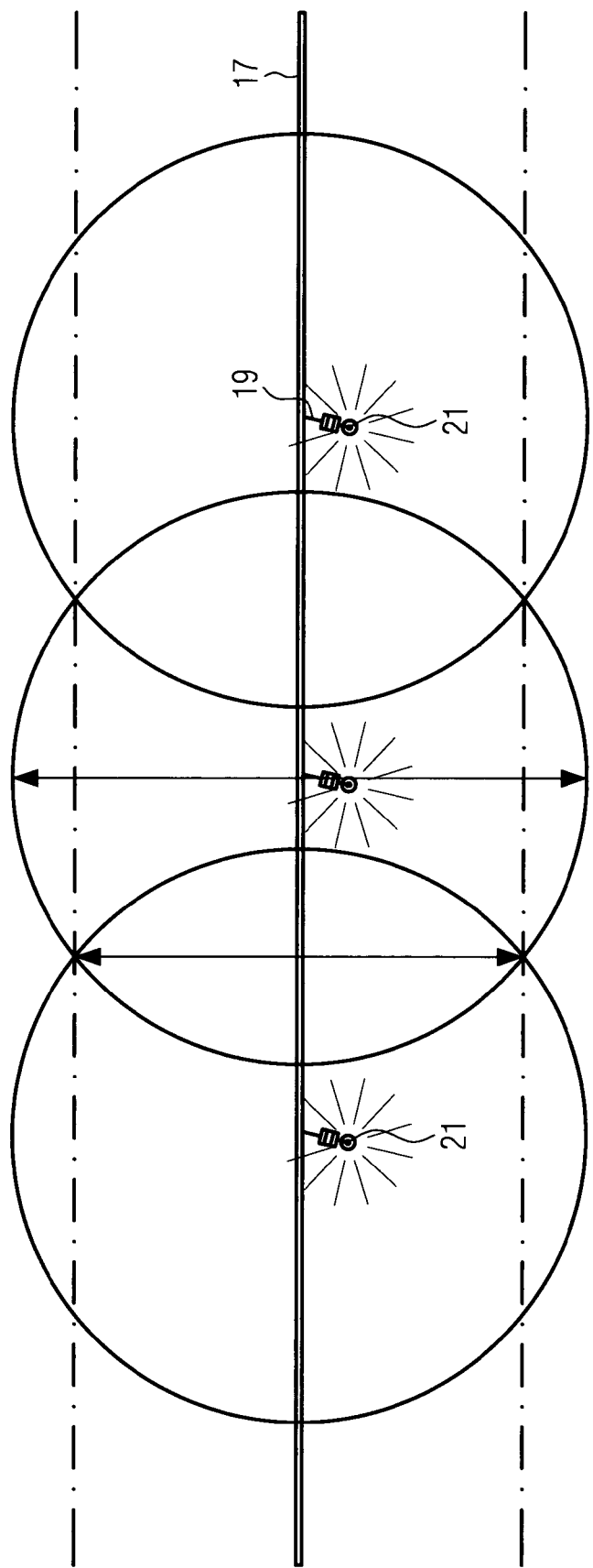
Figure 7:
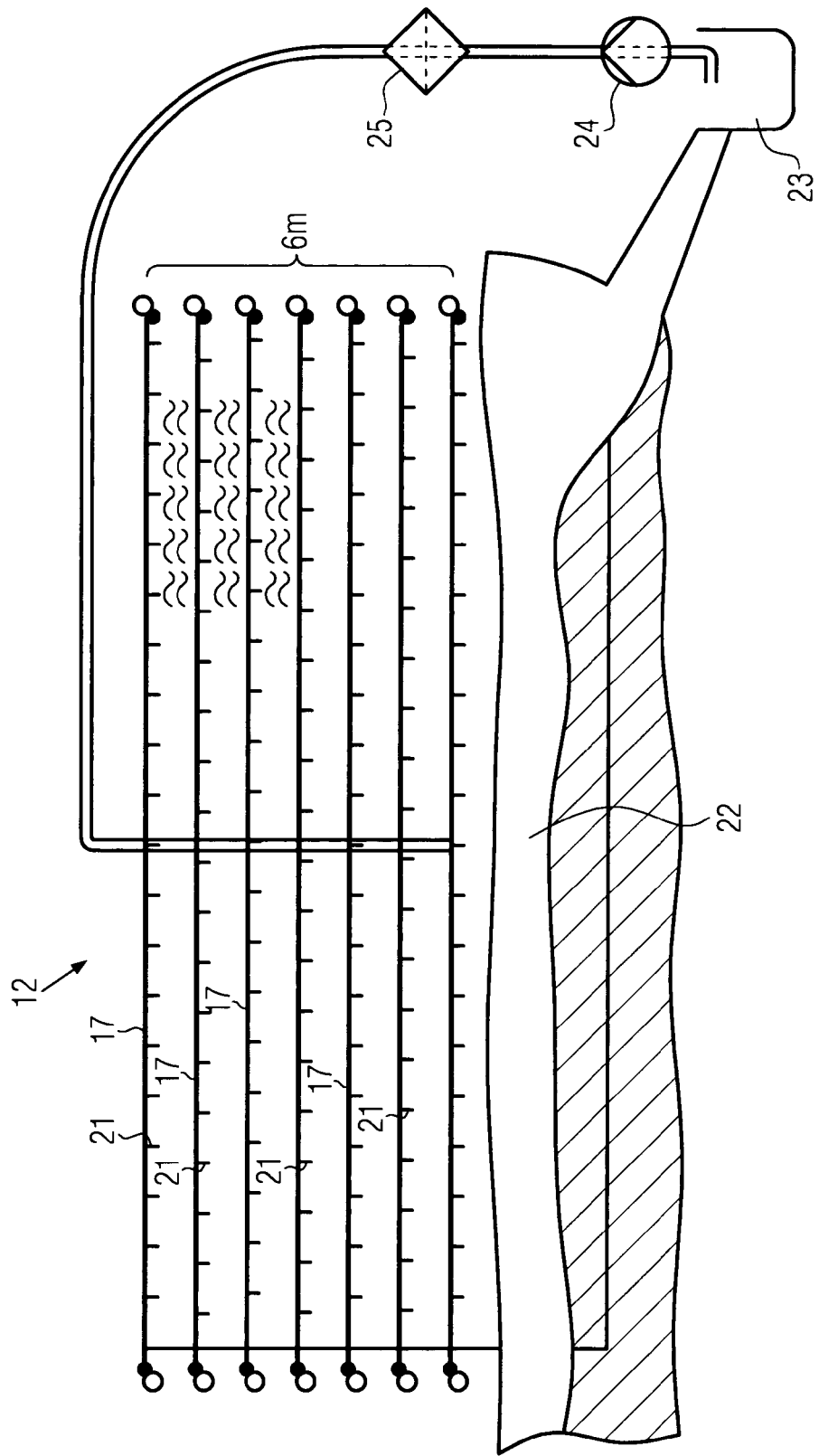
Figure 8:
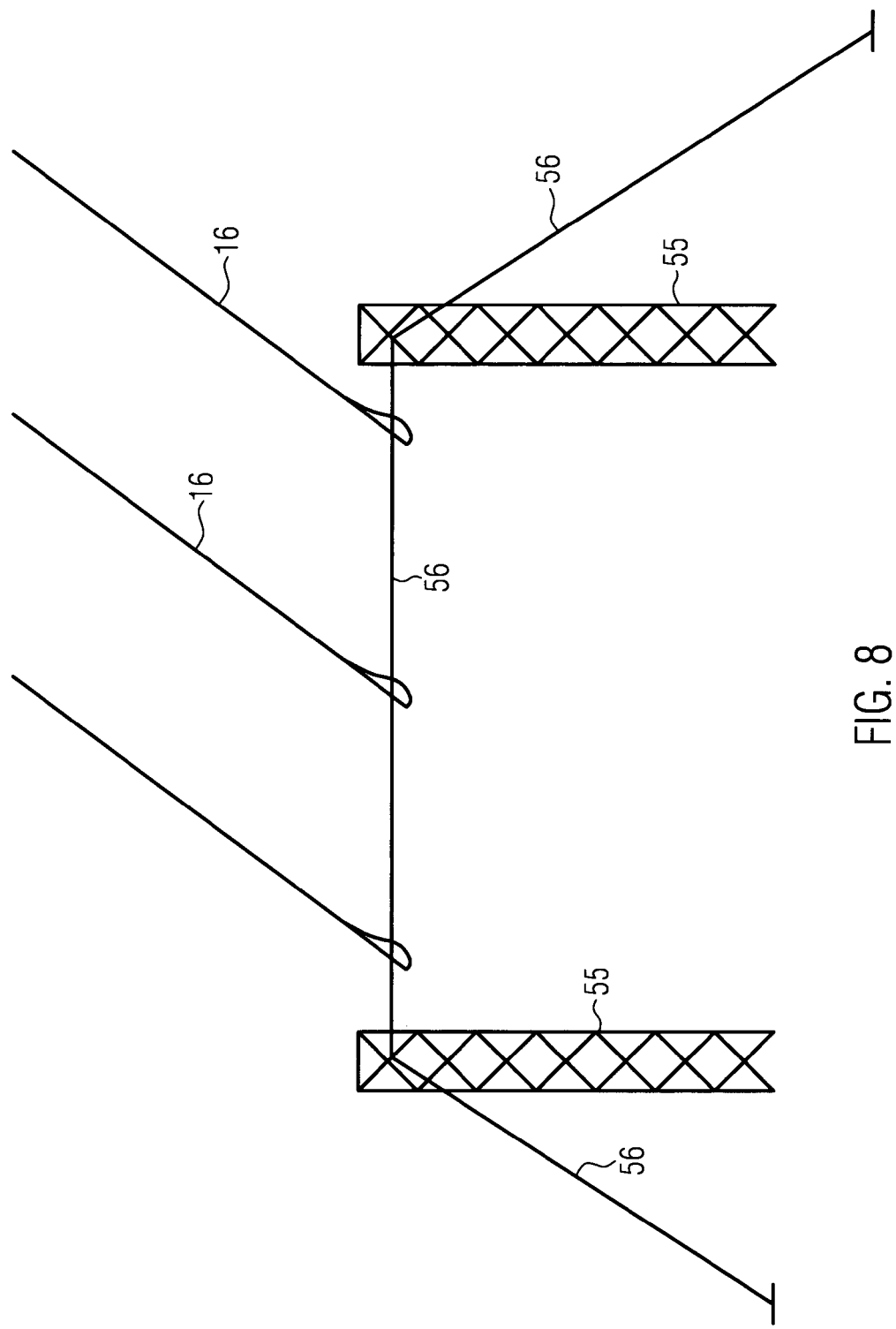
Figure 9:
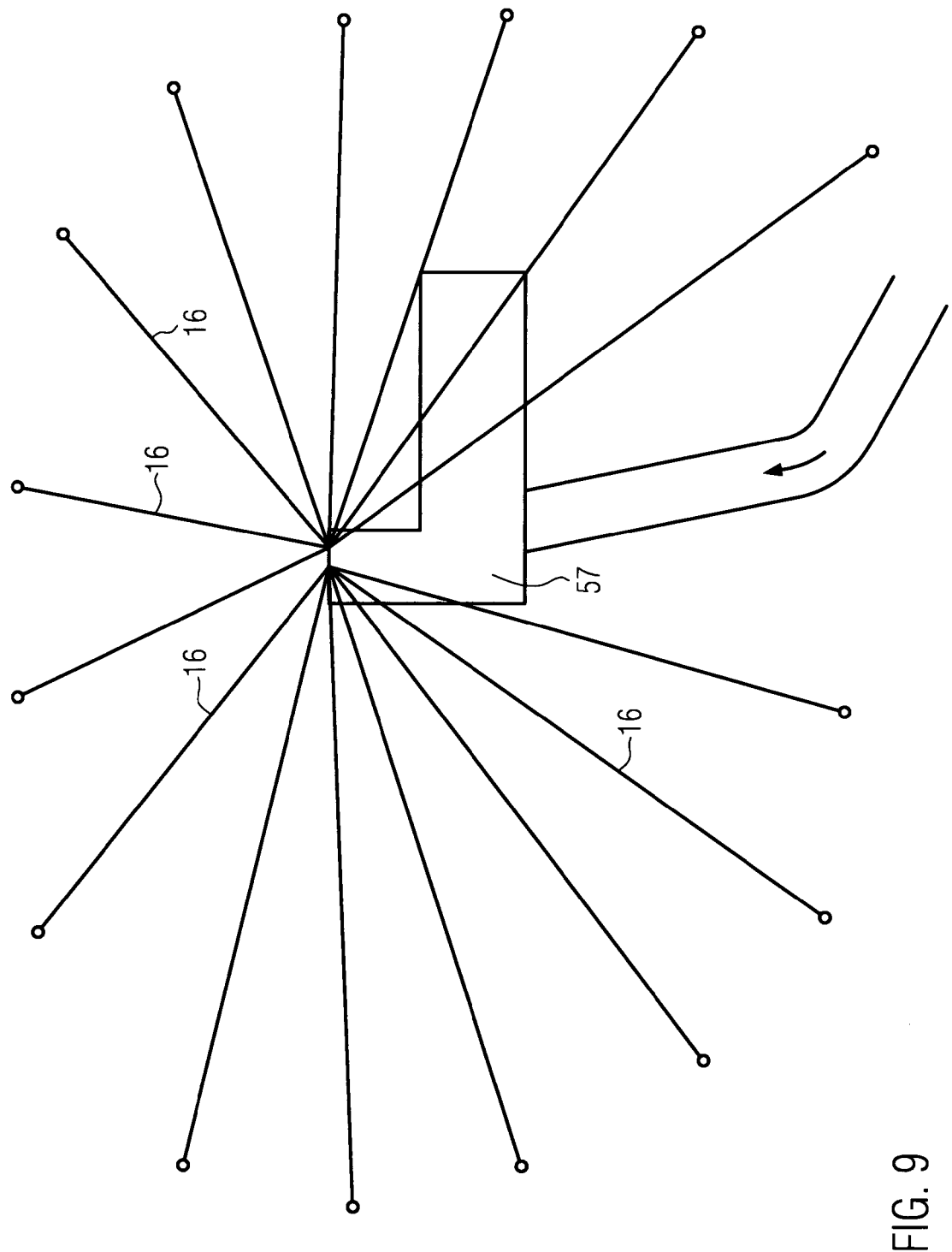
Figure 10:
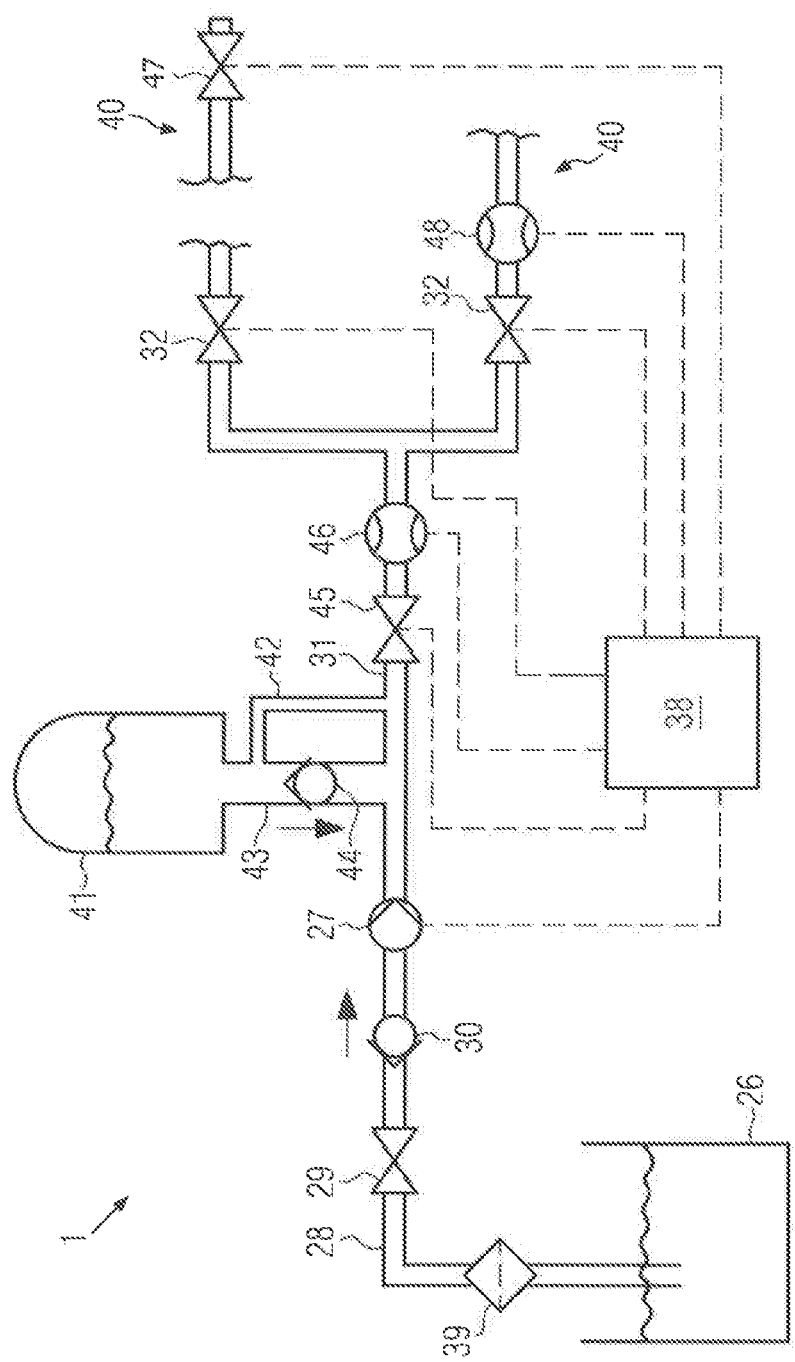
Figure 11:
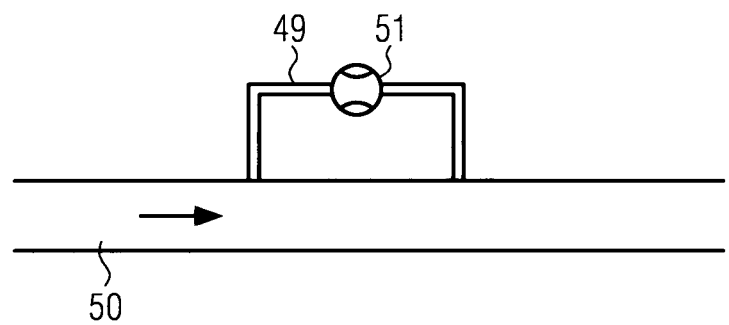
Figure 12:
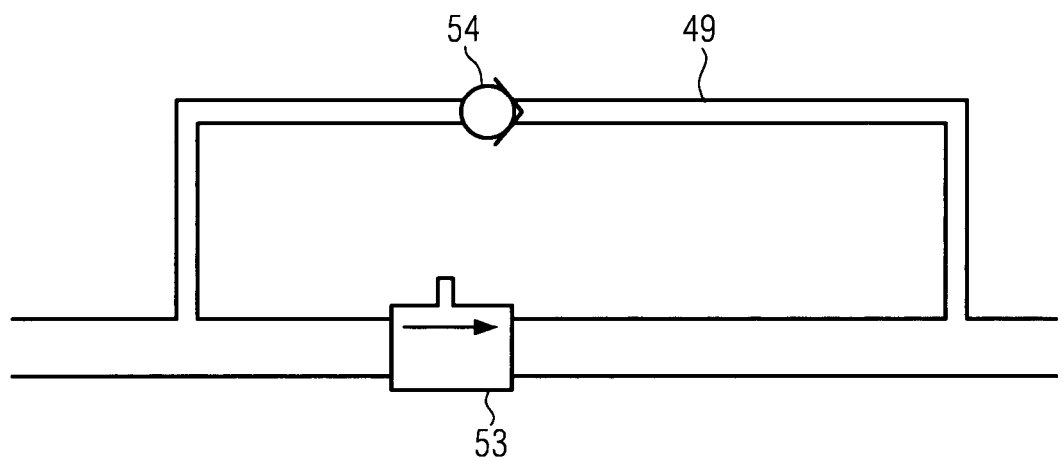
Figure 13:
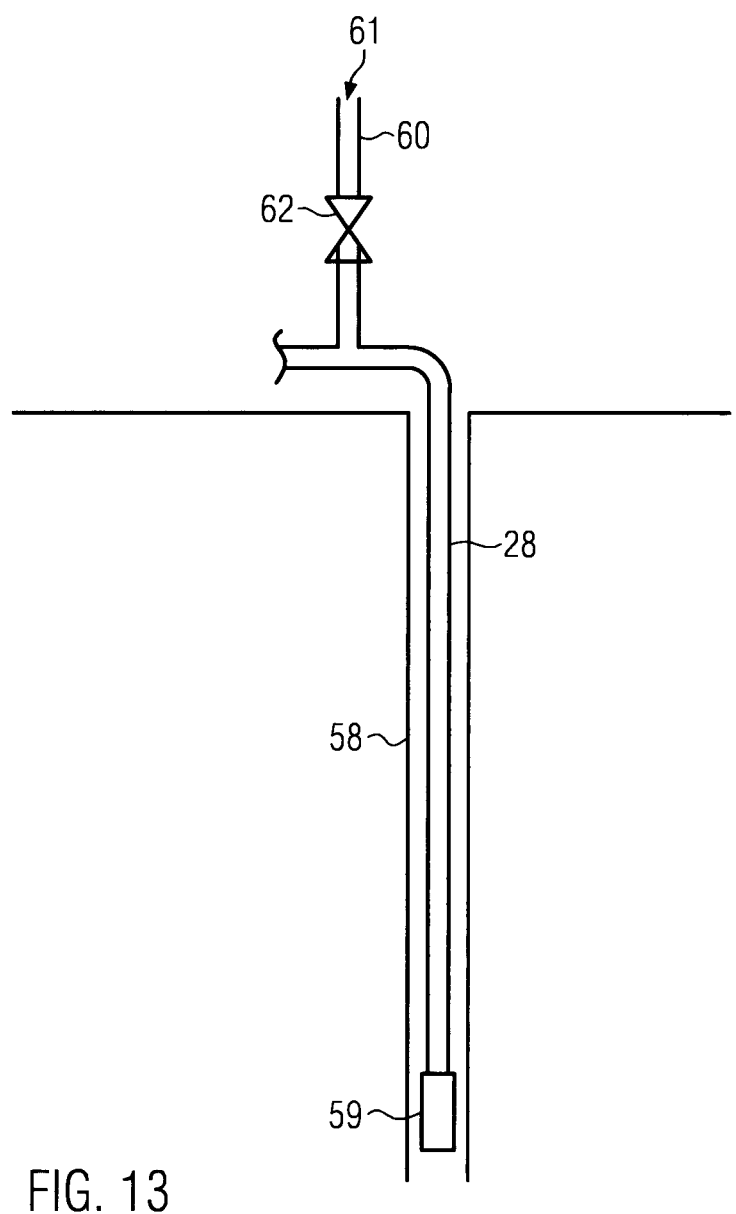

FIG. 5 spray nozzles on a suspended pipeline in a schematic roughly simplified perspective view FIG. 6 a spraying area of the nozzles of FIG. 5 in a schematic plan view FIG. 7 an apparatus to create a fog wall, in a schematic side view FIG. 8 a cable arrangement for the mounting of a suspended pipeline system FIG. 9 a further cable arrangement for the mounting of a suspended pipeline system FIG. 10 line plan of a further apparatus for the binding of dust FIG. 11 a volumetric flow measurement in the secondary run FIG. 12 a secondary run with non-return valve for the relief of pressure zones, and FIG. 13 a detail of an apparatus for the binding of dust with a well pipe.

The apparatus according to the invention is used for the binding of dusts of a wide variety of origin, in particular mineral dusts, plastic dusts, wood dusts, also air impurities, by means of precisely applied binders. "Dust", for the purposes of the present invention, covers all solid and liquid particles in an atmosphere which can be removed from the atmosphere by a binder or which may be bound by a binder on the ground, so that they do not return to the atmosphere. As well as solid particles, dust may also include aerosols or vapors.

The binder is preferably water. The water is used generally without further additives, in particular without wetting agents. Only in winter operation may it be expedient to add anti-freeze. The water may be drawn from various sources, for example, wells, drinking water pipes, cisterns or the like. If the water contains impurities, then it is expedient to provide a filter. The pore size of the filter should not exceed 200 µm, and preferably should not exceed 150 µm. It may also be expedient to use filters with a pore size of 130 µm.

A first embodiment of a dust binding apparatus 1 for an open-cast working is shown in FIG. 1. The open-cast working may be a gravel working for the extraction of gravel or a stone quarry for the quarrying of stone. In the present embodiment, the open-cast working is a gravel working. The gravel working has an unpaved roadway 2 which leads over a ramp 3 into a gravel pit 4.

This gravel pit 4 has a screening unit 5 and a conveyor belt run 6. The conveyor belt run 6 extends from a feed hopper 7, which is located in the gravel pit 4, to a processing shed 8 which is located outside the gravel pit 4. The conveyor belt run 6 is made up of several conveyor belts, wherein two adjacent conveyor belts form a transfer point 9 at which the gravel to be conveyed falls from one conveyor belt onto another conveyor belt.

The screening unit 5, the feed hopper 7 and the transfer point 9 of the conveyor belt run 6 form large sources of dust. In gravel pits and quarries, all locations at which gravel or stone is moved and poured or dumped are potentially intensive dust sources. Other dust sources are, for example, stone-crushers, silos and gravel or stone heaps onto which conveyor belts discharge, together with handling areas.

In addition, dust is swirled up by vehicles moving along the ramp 3 and the roadway 2.

Whether or not a certain area is to be rated as a dust source, at which dust must be bound, also depends on the requirements for dust purity set by the adjacent neighborhood. In the case of the gravel working shown in FIG. 1 agricultural areas, for example meadows or fields, border the lower edge and right-hand edge of the gravel working in FIG. 1. Such agricultural areas set high requirements for dust purity, since grass or crops contaminated by dust are impaired in quality and considerably reduced in value. In the case of the gravel working shown in FIG. 1, industrial areas with only limited sensitivity to dust border the upper and left-hand edge.

In order to satisfy these different requirements for dust formation and dust sensitivity, the dust binding apparatus 1 includes a wetting device 10 for wetting the roadway 2 and the ramp 3 with binder, several local fog screen units 11 and two fog walls 12.

The fog screen units 11 are provided for screening the local dust sources in the gravel pit 4. The fog walls 12 are located in FIG. 1 at the bottom and right-hand edge of the gravel pit 4, to prevent the transfer of dust from the gravel pit 4 to the adjacent agricultural areas.

The wetting device 10 has pipe sections 13/1 and 13/2 running next to the roadway 2 on both sides. These pipe sections 13/1 and 13/2 are rigid pipes 13 (FIG. 3) laid on the ground, from which at regular intervals (e.g. every 5 to 10 m, preferably every 6 to 8 m) there branches off a standpipe 14 running vertically upwards. The standpipes 14 have in each case a length of 0.5 to 2 m. At the upper free end of each standpipe 14 is a spray nozzle 15. Provided on the standpipe 14, adjacent to the spray nozzle 15, is a manually operable shut-off valve, in particular a ball valve, by which the water supply to each individual spray nozzle 15 may be switched on or off separately.

Preferably the spray nozzles 15 are in the form of pressure nozzles, which only open automatically from a predetermined opening pressure upwards, and close automatically below a predetermined closing pressure. By this means it is ensured that, on the one hand, binder is discharged only when there is an adequate pressure for spraying at the spray nozzle 15. Moreover, the automatic closing of the spray nozzles 15 ensures that the standpipe 14 and the pipe section 13 do not empty when the wetting device 10 is not in operation. In this way, refilling of the pipe sections 13 and the standpipes 14 is avoided, by which means on the one hand the risk of pressure shocks may be considerably reduced, and on the other hand operation may be allowed without significant delay. In addition, any unevenness in binder discharge, which might result from partial or complete emptying of the line, is avoided by this means. The spray nozzles 15 are so designed that the binder is sprayed with a droplet size corresponding to a fine spray mist. The droplet size is subject to a certain distribution, wherein the overwhelming number of droplets have a droplet size of at least 100 µm, preferably at least 150 µm or at least 200 µm. They create a fine spray mist which can be distributed evenly over a predetermined area (FIG. 1) in a semi-circle or a circle or a circle segment (e.g. a circle segment with 90° or 125°) or with an angular shape.

The amount of binder evaporated during spraying is low. The droplets may be sprayed by the spray nozzle 15 to a distance of around 5 to 12 m. The spray nozzles 15 are designed with a semi-circular spray pattern and so arranged that, with this spray pattern, they cover the adjacent roadway 2 (FIG. 4). For wetting a roughly 5 m wide strip over a section length of 100 m, around 2 to 4 m³ binder are discharged. For this, the operating pressure at the nozzle is around 2.5 to 4.5 bar, in order to ensure a reliable dispersion of the spray mist. In practice it has been found that interval operation with a spraying time of around 5 to 15 minutes and a pause of around 5 to 30 minutes, wherein the pause should be at least as long as the spraying time, leads to efficient wetting. The pause times are adapted, preferably automatically, to the weather conditions. The hotter and drier the ambient air, or the more wind is present, the shorter the pauses should be made.

Control of the spraying time for wetting the ground may also be effected on the basis of the subsoil. Sealed ground such as e.g. an asphalt surface, may absorb no significant amount of binder. For sealed ground, therefore, interval operation with a spraying time of around 5 to 15 minutes and a pause of around 5 to 30 minutes, without intensive pre-wetting, is preferred.

If the ground, on the other hand, is not sealed, then it generally has a porosity which can store binder and release the stored amount of binder. The ground then forms a binder reservoir similar to a sponge. For unsealed ground, preferably intensive pre-wetting is first carried out, lasting at least 30 minutes, preferably at least 45 minutes, and in particular at least 1 hour, with binder being released at a rate of 1 to 3 l/m². Thereafter, interval operation with short spraying times of around 2.5 to 10 minutes at a rate of 1 to 3 l/m² and pauses of around 5 to 30 minutes may be implemented, in order to replace binder released by the ground.

The control of spraying times is carried out preferably automatically by means of a central control unit. The central control unit may set spraying times automatically on the basis of predetermined weather parameters (amount of precipitation, temperature, wind speed, air humidity, intensity of solar radiation). The weather parameters may be supplied by suitable weather sensors (thermometers, wind gauges, rain gauges) or by weather data obtainable from the internet.

In addition to the above-mentioned weather parameters, soil moisture may also be measured and taken into account in the control of spraying time. Allowance for soil moisture is especially expedient for dust binding apparatus systems which wet the ground with binder to avoid dust. These dust binding apparatus systems are used in particular for porous ground, on which dust may be swirled up. Depending on their porosity, these types of ground have varying capacity for the absorption of water. Accordingly, the thresholds for soil moisture are to be determined and set empirically. The measurement of soil moisture may also be expedient for fog-creating dust binding apparatus systems. Here above all a measurement of soil moisture is used to determine whether too much moisture is reaching the ground, with a risk of forming puddles.

The aforementioned weather parameters and/or soil moisture are preferably combined in such a way that they are a criterion for evaporation. The greater the evaporation, the longer the automatic overlap spraying times will be regulated or the more frequently spraying will take place. The evaporation rate may be represented for example by the combination of atmospheric humidity, wind velocity, temperature and intensity of solar radiation. The regulation of spraying times is made preferably in such a way that as far as possible exactly the amount of evaporated moisture is replaced.

Such a control unit serves to ensure adequate dust binding, while on the other hand keeping the demand for binder, in particular the need for water, as low as possible. This control unit is shown here for an embodiment for wetting the ground with binder. Such a control unit may equally be used for binding dust by means of artificial fog.

The maximum length of any such wetting apparatus is around 500 m. If longer stretches need to be wetted, then several such wetting units may be provided consecutively.

Provided along the ramp 3 is a suspended wetting device 10/2. The suspended wetting device 10/2 comprises a thin bearer cable 16, which is a steel cable, a pipeline 17, pipeline hooks 18, by which the pipeline 17 is suspended from the bearer cable 16, flexible branch lines 19 and spray nozzles 20. The spray nozzles 20 are of similar design to the spray nozzles 15. They have however a full-circle spray pattern, so that the wetting device 10/2 may be positioned centrally over the ramp 3 and the ramp is completely or almost completely covered by the spray pattern. Around every 5 to 7 m, a flexible branch line 19 with a spray nozzle 20 is provided along the pipeline 17. Adjacent to the spray nozzle 20 on the flexible branch line 19 is a stabilizer 52, which encompasses the branch line 19 and, on account of its weight, ensures that the flexible branch line 19 hangs downwards and is aligned vertically, at least with its bottom section. By this means, the flexible branch line 19 positions and adjusts itself automatically, even if the whole wetting device 10/2 is moved due to external circumstances, for example wind. The spray nozzles 20 are preferably once again in the form of pressure nozzles, which open after a predetermined opening pressure is reached and close automatically after a predetermined closing pressure. The opening pressure lies in the range of 1.5 to 4 bar. The closing pressure is in each case somewhat lower. The maximum length of the wetting device 10/2 is around 500 m. The wetting device 10/2 is preferably operated at intervals of 10 to 15 minutes, with pause times of 10 to 30 minutes. The wetting device 10/2 is preferably arranged at a height of at least 5 to 6 m above the ground. The pipeline 17 is preferably made from plastic pipe, in particular polyethylene pipe. It has an inside pipe diameter of for example 16 to 40 mm.

The fog screen units 11 are in principle formed in exactly the same way as the suspended wetting device 10/2, with a bearer cable 16, a pipeline 17, pipeline hooks 18, flexible branch line 19 and spray nozzles 21 (FIG. 5). The spray nozzles 21 of the fog screen units 11 differ from the spray nozzles 20 of the wetting device 10 in that they spray the binder much more finely, i.e. with a droplet size of 30 to 120 µm, in particular 60 to 90 µm. Such fine droplets form a fog, which settles gradually on the ground. Such fine droplets cannot be sprayed so far as the larger droplets of the wetting device 10 described above. The maximum range here is around 1.5 m and generally lies between 0.8 and 1.3 m. The spray nozzles 21 with their flexible branch lines 19 are arranged on the pipeline 17 at intervals of 0.7 to 1.5 m, in particular intervals of 0.9 to 1.2 m. To provide an especially dense fog it may also be expedient to arrange two fog screen units 11 next to one another in parallel, with the pipelines 17 arranged at a distance of 1 to 2 m apart. The nozzles of the two fog screen units 11 are then preferably arranged offset to one another in the axial direction.

The pipeline 17 is preferably made of flexible plastic, e.g. flexible polyethylene. Holes may be punched in such a pipeline 17 in order to connect the branch lines 19. This may also take place after complete installation of the system, by which means it is also possible to provide locally, as required, several spray nozzles 20 on a line. If an especially dense fog is required locally then the spacing of the spray nozzles may be reduced to 0.5 m or 0.25 m or even to 0.1 m. Equally it is possible to remove subsequently spray nozzles 21 or a branch line 19 with the corresponding spray nozzles 21, and to close the relevant opening with a plug. In this way, subsequent changes may be made to the system. This is especially advantageous in cases where, owing to changed circumstances, a different requirement for fog has arisen. Such changes are always possible when the pipeline is made of a plastic in which it is possible to stamp or punch the relevant holes. This applies equally to a suspended and to a ground-based system in which the relevant pipeline is laid on the ground.

The use of flexible plastic pipes for the pipeline 17 also has the following advantages:
  Due to the elasticity of the plastic pipes, extensions in length may be absorbed easily. Consequently, these systems may be installed and operated simply over long stretches from 500 m up to 5 km. In the case of steel pipes there would be the danger that, on account of temperature fluctuations, longer extension might occur, leading to leaks at the joints.
  The plastic pipes are weatherproof. In the event of a storm, they yield elastically, returning to their original position after the storm.
  With a suspended system, mounting on the steel bearer cable 16 is very easy, by fixing the pipeline 17 using the pipeline hooks 18. For permanent mounting of the pipeline 17, a steel cable with a diameter of 5 to 8 mm is sufficient, supports for tensioning the steel cable may be provided at intervals of 50 to 150 m, so that large areas may be spanned and the supports do not interfere with operations beneath them.
  The apparatus may be variably enhanced by extra nozzles, or nozzles may be subsequently removed.

The operating pressure is around 3 to 6 bar. The higher the operating pressure, the finer are the droplets and therefore the better the ability of the fog to float in the air, although there is also a greater susceptibility to the effects of wind. Here too it is possible to use the aforementioned pressure nozzles with predetermined opening and closing pressure.

Such a fog screen unit 11 may be used in continuous operation. It may, however, also be expedient to operate such a fog screen unit with very short pulses of 1 second to 120 seconds and corresponding short pauses of 1 second to 120 seconds since, due to the floating ability of the fog, even with such pulsed operation, a permanent fog wall may be provided. With such a pulsed operation, consumption of binder may be considerably reduced, without impairing the efficacy of dust binding. This kind of pulsed operation is especially advantageous at locations with no or only very limited airflow.

The fog walls 12 are formed just like the fog screen units 11 but comprise one or more parallel pipelines, which extend over longer distances and are provided throughout with spray nozzles 21 at regular intervals. The pipelines 17 may also be arranged lying vertically one above the other (FIG. 7), so that a fog wall with a height of several meters is formed. In the embodiment shown in FIG. 7, seven pipelines 17 are arranged one above the other, in each case with a spacing of 1 m, so that a fog wall with a height of seven meters is formed.

Both the fog screen unit 11 and also the fog wall 12 are so arranged relative to a dust source that the fog is created not at the dust source but instead at a short distance from the dust source. At the point of origin of the dust there is generally a strong airflow, which swirls up the dust. Supplying such a dust origin point with fog would only lead to the fog being moved away from this point by the airflow, and a large portion of the binder would have no effect.

The fog is therefore provided at a point adjacent to the point of dust origin, where the air is calmer. Here the dust may be bound much more efficiently. The airflow is preferably limited to a maximum of 1 m/s, in particular 0.8 m/s or 0.7 m/s and preferably to a maximum of 0.5 m/s. The distance between the area in which the artificial fog is provided and the point of origin of the dust is therefore chosen so that this limit value is maintained.

The fog screen units 11 are preferably so designed that, as far as possible, they completely surround the dust source. If the dust source is already screened off by a physical wall, then it may also be expedient to design the fog screen so that its ends are flush with this wall, so that together with the wall the dust source is surrounded, and in particular the movement of the dust along the wall and beyond it is prevented. The fog screen unit thus forms a wall termination.

The fog wall 12 preferably has a gutter 22 to collect the fog droplets. The water collected in this way is fed to a tank 23 from which it is pumped back into the pipeline 17 of the fog wall by means of a pump 24. The binder is thus conveyed in a circuit. Provided at one point in this circuit is a filter 25, by which the dust particles are removed from the water. Alternatively, of course, the water which has been used once may be disposed of, in which case no filter need be provided.

The fog wall 12 preferably has a central binder source 26, which may be for example a well (FIG. 2). The binder is preferably pure water. The water is taken from the binder source 26 by means of a pump 27. Located in a line section 28 which extends from the binder source 26 to the pump 27 are a manual shut-off valve 29 and a non-return valve 30 which, in the event of a pump failure, prevent water from flowing back into the binder source 26. At the outflow side of the pump 27, a main line 31 leads to the wetting device 10, the fog screen units 11/1 and 11/2, and the fog walls 12/1 and 12/2. From the main line 31 a main run branches off to the wetting device 10, the fog screen units 11/1 and 11/2, and the fog walls 12/1 and 12/2. Provided at the main runs are switching valves 32/1 to 32/5 respectively, which may be operated individually by a central control unit 38. With the switching valves 32/1 to 32/5, the water supply to the individual main runs may be switched on and off. By actuating switching valve 32/1, interval operation with a spraying time of around 5 to 15 minutes and a pause of 5 to 30 minutes may be initiated at the wetting device 10, and by actuating switching valves 32/2 to 32/5, short pulses of 1 second to 120 seconds with corresponding short pauses of 1 second to 120 seconds may be initiated at the fog screen units 11/1 and 11/2 and/or at the fog walls 12/1 and 12/2.

A wetting device 10 divides the main run into two sub-runs for the lying wetting device 10/1 and the suspended wetting device 10/2. Located at the start of each of the two branch runs is a pressure reducer 33/1, 33/2, which reduces the pressure provided by the pump 27 to the operating pressure of the respective wetting device 10/1 or 10/2. In the main runs of the fog screen units 11/1 and 11/2 and the fog walls 12/1 and 12/2 there is also in each case a pressure reducer 33, which here too sets the operating pressure suitable for the respective spray nozzles 21. Instead of the pressure reducers, further pumps may also be provided, which then generate a higher pressure especially for the fog screen units 11/1 and 11/2, so that the operating pressure of the main pump 27 may be lowered. This therefore involves a further, decentralized binder feed.

The wetting device 10, the individual fog screen units 11/1 and 11/2, and the individual fog walls 12/1 and 12/2 may be operated independently of one another. From the main run of the fog screen unit 11/1 there branches off a branch run 34, by which the screening unit 5 is surrounded. The spray nozzles 21 are here arranged at a predetermined distance of 0.5 to 1.5 m from the screening unit 5, which forms a major dust source, so that a fog wall forms at this distance around the dust source. In a corresponding manner, further branch lines 35, 36, 37 are provided at the second fog screen unit 11/2, in order to surround the feed hopper 7 and the transfer points 9 at a suitable distance.

The line section 28 may also be in the form of a well pipe (FIG. 13). The well pipe 28 extends through a vertical well bore 58 deep into the earth. Instead of the pump 27, a deep pump 59 is installed in the well bore 58 and connected to the well pipe 28, in order to pump water from the well bore 58 into the dust binding apparatus 1. Provided in the section of the line section above ground is a branch run 60, which branches off from the line section 28 and has a drain hole 61. Located in the branch run 60 is a control valve 62, which may be operated by a central control unit.

Instead of the vertical well bore 58, a shaft or a concreted deep tank may also be provided. On switching on the pump 59, the control valve 62 is gradually closed over a predetermined time interval. In this way, the pump 59 builds up a pressure in the line section 28 not suddenly but gradually, since to begin with, a portion of the water and/or binder in the branch run 60 escapes from the drain hole 61 through the control valve 62.

On switching off the pump, the control valve 62 is gradually opened, whereby the pressure in the line section 28 is gradually reduced, thereby counteracting a pressure shock. The opening of a control valve preferably takes place shortly before switch-off of the pump so that, on switching off the pump, there is already a reduced pressure in the line section 28, thereby reducing the risk of a pressure shock. The control valve 62 may also be designed as an automatically opening pressure control valve, which opens once a predetermined opening pressure is reached. This opening pressure is greater than the operating pressure. If there is a sudden failure of the pump 59, a pressure peak is generated in the line section 28 and is dissipated via the automatically opening pressure control valve 62. Due to reflection, several consecutive pressure peaks may occur and are diverted away one after the other via the branch run 60. It is also possible that this or another valve immediately opens suddenly on pump failure, on the one hand so as to divert pressurized binder, or to facilitate diversion for the following pressure peak—it is therefore already open before occurrence of the pressure peaks—consequently it is also not necessary for these peaks to be detected by the valve. It is also possible that this or another valve allows an inflow of air or other media, so as to counteract the risk of a cavitation shock.

In principle it is also possible to provide two separate branch runs, wherein, in one branch run a control valve operable by the central control unit and in the other branch run an automatically opening pressure control valve are provided. It is also possible to provide just a single branch run, in which the automatically opening pressure control valve is provided.

FIG. 8 shows masts with tension cables 56 for fixing the bearer cables 16. The bearer cables may, however, also be fixed directly to any other desired elevation, e.g. a building 57 (FIG. 9).

FIG. 10 shows the line-routing plan of a second embodiment of the dust binding apparatus 1. Parts identical to those of the first embodiment are given the same reference number and are designed exactly like those in the first embodiment, so that a precise description of these parts may be omitted.

This dust binding apparatus 1 again includes a binder source 26 or binder reservoir, a pump 27 which delivers binder, in particular water, from the binder source 26 via a line section 28. Located in the line section 28 are a manual shut-off valve 29 and a non-return valve 30. Also provided in the line section 28 is a filter 39. The filter may be provided with a filter medium which has a pore size of 130 μm. It is, however, possible to provide a filter without filter medium, such as for example a cyclone filter.

From the pump 27, a main line 31 leads to a wetting device and/or to a fog screen unit or a fog wall. These facilities have in each case at least one line run with one or more spray nozzles. These facilities are therefore generally described below as nozzle run 40. The second embodiment has two such nozzle runs 40, each beginning with a switching valve 32. Connected to the line 31 leading to the nozzle runs 40 is a pressure vessel with gas cushion 41. From the line 31 to the pressure vessel with gas cushion 41 leads a thin feed line 42 and a thick discharge line 43. Provided in the discharge line 43 is a non-return valve 44, which is so fitted that water from the pressure vessel with gas cushion 41 can flow only in the direction of the line 31 through the discharge line 43.

If the pressure vessel with gas cushion 41 is filled with water, then this water flows solely through the thin feed line 42. On draining of the pressure vessel with gas cushion, the water can flow both through the discharge line 43 and also through the feed line 42 into the line 31, and from there to the nozzle runs 40. The diameter of the discharge line 43 is preferably at least twice and in particular four times as large as that of the feed line 42. It is however also possible that the feed line 42 acts only as feed line, if it contains e.g. a restrictor element with passage in only one direction.

Through the provision of the thin feed line 42 and the thick discharge line 43, emptying of the pressure vessel with gas cushion may take place significantly more quickly than filling.

Provided in the line 31 is a switching valve 45 which is operated by the central control unit 38. The switching valve is fitted in the direction of flow after the pressure vessel with gas cushion 41. The switching valve 45 has several opening positions, so that by means of the switching valve 45, different cross-sections may be set. The opening cross-section may be varied in several steps or also without steps.

Provided in the area between the switching valve 45 and the nozzle runs 40 is a flow meter 46 which is connected to the central control unit 38 and transmits to the latter the respective current volumetric flow. A further flow meter 48 is provided in at least one of the nozzle runs 40.

At the end of one of the nozzle runs 40 is a switching valve 47, which may be operated by the central control unit 38 to drain the nozzle run 40.

Unless otherwise stated below, this dust binding apparatus 1 of the second embodiment functions in exactly the same way as that of the first embodiment, in that water is sucked out of the binder source 26 by the pump 27, fed to the nozzle runs 40, and is there discharged via spray nozzles (not shown in FIG. 10) controlled by the switching valves 32.

The switching valve 47 at the end of one of the nozzle runs 40 has two functions. If this dust binding apparatus 1 is operated in winter then, if there is a danger of frost, the nozzle run 40 may be drained by opening the switching valve 47 so that air is allowed into the nozzle run 40. The air may be provided from a compressed air source or by means of a suitable pump. If the binder or the water has impurities, these generally collect in the end section of the nozzle runs 40. These impurities may be flushed out by opening the switching valve 47 and flushing the nozzle run 40 with water.

Both the draining of the nozzle run 40 and also the flushing of the nozzle run 40 are controlled by the central control unit 38.

The pressure vessel with gas cushion 41 may be a diaphragm vessel which has a diaphragm dividing the diaphragm vessel into a gas pressure chamber and a binder chamber. On filling of the pressure vessel with gas cushion 41, the gas in the gas pressure chamber is compressed, which raises the pressure in the pressure vessel with gas cushion 41. If one or more of the nozzle runs 40 is drained, then they must be completely refilled before operation can be resumed. With the pressure vessel with gas cushion 41, a large volume of binder may be made available quickly. On account of the large cross-section which is available during discharge of the binder from the pressure vessel with gas cushion through the discharge line 43 and the feed line 42, the binder may be conveyed rapidly, i.e. with a high volumetric flow, to the nozzle runs 40. A rapid movement of binder or water into the incompletely filled nozzle runs conceals the risk of a pressure shock, which occurs when the nozzle run concerned is completely filled. In this respect, use of the pressure vessel with gas cushion 41 is advantageous, since, on conveying the binder out of the pressure vessel with gas cushion the gas pressure chamber expands, causing the pressure in the pressure vessel with gas cushion 41 to reduce, and to reduce further with increasing withdrawal from the pressure vessel. This means that, at the start, the binder is conveyed out of the pressure vessel 41 under high pressure towards the nozzle runs 40, wherein this pressure and with it the flow rate reduce. In this way the risk of a pressure shock is somewhat reduced. At the same time, at the start of conveyance, a large amount of binder from the pressure vessel with gas cushion 41 is made available very quickly, so that drained nozzle runs 40 may be rapidly refilled.

If the lines are flexible plastic lines, then these lines also form a binder buffer. When operation is started, firstly from the pressure vessel the "buffer" of the lines is filled, which counteracts pressure shock during rapid line filling. The combination of a pressure vessel with gas cushion and flexible plastic lines is therefore especially advantageous.

In operation, conditions occur very seldom in which the pressure vessel with gas cushion is completely filled or completely empty. Instead, the pressure vessel with gas cushion is mostly partly filled and partly empty, so that in operation it can compensate quickly and reliably for fluctuations in binder requirement, without the risk of pressure shocks.

The volumetric flow fed through the line 31 by the pump 27 and the pressure vessel with gas cushion 41 is measured by the flow meter 46. The control unit that detects this volumetric flow may, with the aid of this volumetric flow, set the pumping capacity of the pump 27 and/or the opening cross-section of the switching valve 45. If a maximum permissible volumetric flow is exceeded, the pumping capacity of the pump 27 may be reduced, and/or the opening cross-section of the switching valve 45 may be reduced, by which means both the volumetric flow from the pressure vessel with gas cushion 41 and also the volumetric flow generated by the pump 27 may be controlled. Since the pressure vessel with gas cushion 41 is connected to the line 31 in the area between the pump 27 and the switching valve 45, the pressure in this line section may be so controlled by the pumping capacity of the pump 27 and the opening position of the switching valve 45 that water flows into the pressure vessel with gas cushion 41 when the pressure in this line section is greater than in the pressure vessel with gas cushion 41, and water is withdrawn from the pressure vessel with gas cushion 41 when the pressure in this line section is less than in the pressure vessel with gas cushion 41. In normal operation there is a balance between these two pressures, so that the filling state of the pressure vessel with gas cushion 41 remains constant. Due to the fact that the feed line 42 has a smaller cross-section, the volumetric flow on filling of the pressure vessel with gas cushion 41 is correspondingly low so that, even with a slightly filled pressure vessel with gas cushion 41 and with the nozzle runs 40 not yet completely filled, it is possible to feed the major part of the volumetric flow conveyed by the pump 27 to the nozzle runs 40. If, however, the pressure vessel with gas cushion 41 is filled with binder or water, then a large amount of water may be fed rapidly to the nozzle runs 40 by opening the switching valve 45.

Preferably, filling level sensors (not shown) are provided in the nozzle runs 40. The nozzle runs 40 may have a filling level sensor at each of their end sections. They may be distributed over their length, but also have several filling level sensors. The filling level sensors are connected to the central control unit 38, so that the central control unit 38 may detect the filling levels of the nozzle runs 40. The filling levels may be taken into account in controlling the opening position of the switching valve 45 and the pumping capacity of the pump 27, and the fuller the nozzle runs are filled with binder, the more the volumetric flow or the flow rate is reduced.

The flow meter 48 located in the nozzle run 40 is used to monitor the functioning of this nozzle run. If this nozzle run has, for example, a leak, then the volumetric flow in this nozzle run is increased. It is detected by the flow meter 48. A fault report may be output, and at the same time this nozzle run may be shut off by means of the relevant switching valve 32. If on the other hand one or more spray nozzles are blocked, then the relevant volumetric flow is reduced. This can also be detected by means of the flow meter 48 and a corresponding fault report may be output. The flow meter 48 located in one of the nozzle runs 40 may also be used to detect volumetric flows which are too high and could present a risk of pressure shock. Then, with the aid of this detected volumetric flow in one of the nozzle runs 40, the entire volumetric flow which is controlled by the switching valve 45 and the pumping capacity of the pump 27, is suitably reduced.

Preferably such flow meters 48 are provided in all nozzle runs 40, so that all nozzle runs 40 may be monitored individually.

In addition, using the flow meters 46, 48, the volumetric flows in the dust binding apparatus 1 may be detected and recorded. By this means it is possible to check later whether or not the dust binding apparatus 1 was operating correctly at a certain point in time.

The filling level sensors described above may also be in the form of pressure switches, which output a signal only when a predetermined pressure has been reached. By this means it is possible to detect not only whether the nozzle runs 40 are filled with binder, but also that the filling at the site of the relevant pressure switch has a certain pressure. The switching threshold of this pressure switch should be somewhat less than the operating pressure of the spray nozzles in the nozzle runs 40. Suitable thresholds of the pressure switches lie preferably in the range from 1.5 bar to 3 bar.

With long nozzle runs 40 it may also be expedient, with increasing distance from the binder source 26, to provide spray nozzles with increasingly low operating pressure (opening pressure and closing pressure), since the pressure in the nozzle run 40 may reduce with increasing distance. The individual spray nozzles therefore have a low opening and closing pressure with increasing distance from the binder source 26. The pressure threshold of the pressure switch in the vicinity of the relevant spray nozzles should be matched to the opening and closing pressure of these spray nozzles.

By means of pressure reducers, cross-section restrictions because of a reduction in line cross-section, or through the provision of suitable narrow points, the nozzle runs 40 may also be set in pressure zones in a targeted manner. The pressure zones may be designed for example with reduced pressure with increasing distance from the binder source 26, so that different but defined pressure conditions exist in the individual pressure zones. Through such pressure settings, discharge with very high uniformity may be obtained. The pressure at the respective nozzles may be kept to a defined value permanently, regardless of whether it is the first, the last or any intermediate nozzle of a line. Preferably the nozzles are in the form of pressure nozzles with a predetermined opening and/or closing pressure, as described above.

The central control unit 38 may be designed so as to delay switching on and off of the pump 27. This is expedient in particular if the pumping capacity of the pump 27 is not gradually adjustable. Switching the pump 27 on and off may cause cavitation problems in the pump or its assigned components and may in each case create a pressure shock in the lines. If the switch-off is delayed by a predetermined period of time, then it may be that the operating conditions have changed again in the meantime, so that the pump 27 should no longer be switched off. Such situations occur mainly when the control variables such as volumetric flow, filling level and/or pressure in the line 31 or in the nozzle runs 40 in each case are close to and fluctuate around the relevant thresholds. The dust binding apparatus 1 is designed with a certain elasticity for flexible buffering of binder so that, even when the thresholds are reached, it is still possible to continue operation of the pump 27, to convey a certain volume further or, on the strength of the available elasticity, to provide binder for the nozzle runs 40 without the pumping capacity of the pump 27. This elasticity is provided, for example, by the pressure vessel with gas cushion 41. In addition, such elasticity for the flexible buffering of binder may be provided by pipelines of a flexible plastic material, in particular polyethylene, since this material is able to expand within certain capacity levels and can absorb binder by yielding flexibly. Through such time delay in switching the pump 27 on and off, combined with the flexible buffering of binder, the life of the pump 27 may be extended considerably. This is especially advantageous when the fog screen unit 11 described above or the fog wall 12 described above are operated with very short spray pulses. These pulses may be controlled solely by switching of the switching valves 32, while the pump 27 may be operated continuously.

In the present embodiment, the time delay is realized in the central control unit 38. It is of course also possible to provide a separate time delay element, in particular a time delay relay, which delays switching on or off of the pump 27 independently of the central control unit 38.

It is also possible to provide in the main line 31 and/or in the nozzle runs 40 in each case one or more pressure sensors, which are linked to the central control unit 38. The pressure values recorded by the pressure sensors may be used in a similar manner to the volumetric flows described above to control the volumetric flow in the main line 31 by means of the switching valve 45 and the pump 27. In this case, the switching valve 45 and the pumping capacity of the pump 27 are switched or changed when the measured pressure values exceed or fall below predetermined thresholds. Moreover, predetermined safety thresholds may be provided which are greater than the thresholds for controlling normal operation. If the pressure values measured by the pressure sensors reach the safety thresholds, then this is evaluated by the central control unit 38 as a safety problem, and the pump 27 is completely switched off, and/or safety valves (not shown) in the main line 31 and/or in the nozzle runs 40 are opened, so as to release binder to the outside, by which means the pressure in the dust binding apparatus 1 may be rapidly reduced, and/or warning indications may be given.

In the embodiment explained above (FIG. 10), the pump 27 is located between the non-return valve 30 and the pressure vessel 41. In the context of the invention, the pump 27 may of course also be located under water in the binder source 26.

Flow meters for measuring high volumetric flows are complex and expensive. It is therefore expedient, in particular in areas of high volumetric flows, to provide an auxiliary run 49 (FIG. 11) to a main run 50, wherein the auxiliary run is a line with a smaller cross-section than the line of the main run 50 and leads at both ends into the main run 50. The flow meter 51 which measures the volumetric flow through the auxiliary run 49 is located in that auxiliary run 49. Since the volumetric flows through the 50 and the auxiliary run 49 are in a certain ratio, which corresponds to the ratio of the auxiliary run 49 cross-section to the cross-section of the main run 50, the volumetric flow measured in the auxiliary run 49 may be used to reach a conclusion on the complete volumetric flow through the auxiliary run and the main run. Such an arrangement of the flow meter is advantageous in particular in the main line 31, since high volumetric flows occur here.

To ensure that a flow is actually present, an additional flow monitoring device may be provided in the main run 50 and indicates only whether a flow is present or not. Such a flow monitoring device may involve e.g. an impact disc flow meter. This may be used to determine whether or not there is a flow in the main run, even if the auxiliary run is blocked.

It was explained above that the nozzle runs 40 may be divided by pressure reducers into separate pressure zones. Such pressure reducers 53 generally act like a non-return valve and allow only a flow from the side with higher pressure to the side with lower pressure. If, however, short-term pressure peaks occur, they may gain access to the area with lower pressure or they may, for example, due to switching operations, occur directly in the low pressure area and no longer escape from there, since water cannot flow back through the pressure reducer 53. It may therefore be the case that much higher pressures occur in pressure zones than the usual operating pressure in the respective pressure zone. This can lead to damage.

If the line in which the pressure reducer 53 is located is provided with an auxiliary run 49 in which there is a non-return valve 54 which allows a flow from the pressure-reduced side of the pressure reducer 53 to the side with higher pressure, the such pressure peaks are able to escape from the pressure zones (FIG. 12).

The central control unit 38 may be connected to sensors or online weather services, which detect the current weather conditions (temperature, atmospheric humidity, amounts of precipitation (forecast and already fallen), wind speed and direction, air humidity, evaporation) and control the discharge of binder accordingly. It may also be expedient for the central control unit 38 to receive digital weather information for the appropriate control of binder discharge. It has been found, for example, that at the end of a cool night or in the morning, it is sensible to wet the ground by means of a wetting device, since, with cool air, much less dust-containing water is evaporated than later in the day when it is hotter. Such intensive wetting makes sense especially on unsealed ground. If, however, the weather data show that, after a dry night, rain is expected soon, then intensive wetting shortly before the rain is superfluous. Such weather data is nowadays available with a high degree of precision and may be taken into account in controlling the discharge of binder. By this means, the system capacity can also be adapted to the weather conditions, e.g. by changing the amount of precipitation, by varying the wetting interval or also by switching on or off one or more nozzles or nozzle runs. The amount of binder discharged (per unit of time, either the amount discharged in each wetting operation or the cumulative output per day) may be varied and adjusted in a targeted manner.

The apparatus may also be provided with sensors which detect vehicles and/or persons so that sections of the apparatus may be switched on or off based on the output signals of these sensors. If, for example, vehicles or persons temporarily occupy an area to be sprayed or provided with fog, then the binder supply may be temporarily switched off locally, so that the vehicles or persons are not sprayed. These sensors may be optical sensors, in particular cameras, or induction coils let into the ground to detect vehicles. The local switching on or off of sections may be implemented, for example, with an apparatus in which the spray nozzles and/or specific pipe sections are provided with switchable valves or separate pumps.

It is, however, also possible to provide sensors to detect ground moisture, fog and/or dust creation. These sensors may be moisture sensors or optical sensors such as cameras. Relevant camera images may be analyzed automatically using optical image processing to determine whether the ground is moist, if there is fog in the atmosphere and/or if there is a dust cloud. These optical sensors may be combined with special lighting equipment which makes appropriate dust particles readily discernible. Based on these sensor signals, the intensity of dust binding may be controlled, wherein locally different intensity of dust binding may be set based on the sensor signals.

The operating conditions and/or the sensor signals are preferably recorded and saved. By this means it is possible on the one hand to conform operation of the apparatus and on the other hand to show dust conditions if sensors are present which record dust conditions.

Instead of automatic control, recommendation messages may also be output to an operator at a suitable output facility (screen, loudspeaker), so that the operator of the apparatus can initiate suitable dust binding.

Precipitation rates are explained below with the aid of examples of dust binding apparatus according to the invention:

A dust binding apparatus with a standing arrangement of several spray nozzles 15 according to FIG. 3 is designed for wetting a roughly strip-shaped area. The spray cones of these spray nozzles 15 are semi-circular in shape (FIG. 4). The radius of the spray cones is 6.4 m and the operating pressure is 3.5 bar. An individual spray nozzle 15 sprays an area of around 64 $m^2$ and consumes around 190 liters of binder or water per hour of continuous operation. With continuous operation, the ground is wetted with around 3 liters per square meter per hour. In pulsed operation, consumption of binder per hour may be reduced to approx. 50-70 liters per hour and per nozzle. The spray nozzles 15 are arranged roughly 7 m apart from one another.

A further embodiment of the spray nozzle 15 has a throwing range of 9 m with an operating pressure of 3.5 bar. Otherwise this embodiment of the spray nozzle corresponds to the standing arrangement of spray nozzles described above according to FIGS. 3 and 4 and with semi-circular spray cones. The wetted area per nozzle is around 130 $m^2$ and the consumption of binder or water amounts to around 470 liters per hour per nozzle. This results in a precipitation rate of roughly 3.6 liters per $m^2$ per hour in continuous operation.

Examples of running times for a dust binding apparatus according to the two embodiments described above with a standing arrangement of spray nozzles 15 (FIGS. 3 and 4) are explained below.

On sealed ground, such as asphalt or concrete the ground is wetted for 5 to 10 minutes in cool weather conditions. In warmer weather, wetting takes place for a period of 5 to 20 minutes, with the pause time being from half an hour to around 1 hour. In hot weather (air temperature>20° C.), the wetting time is 5 to 20 minutes and the pause time is reduced to 10 to 20 minutes.

The stronger the wind, the longer the wetting times and therefore the shorter the pause times which are set.

Sealed ground is hardly able to store water. It therefore dries out very quickly and requires regular wetting; otherwise drainage water will occur.

Open natural surfaces such as gravel, crushed stone or sand may store water in contrast to sealed ground.

In cool weather (temperature<13° C.), wetting may take place in the morning for 0.5 to 1.5 hours, with no further wetting for the rest of the day. In warm weather (13° C.<temperature<20° C.) wetting takes place in the morning for 0.5 to 1.5 hours, while further wetting may then be applied for periods of around 10 to 20 minutes, in each case after pauses of 0.5 to 4 hours. The pause time depends mainly on the storage capacity of the ground concerned.

In hot weather (temperature>20° C.), wetting takes place in the morning for 1 to 1.5 hours. Further wetting for periods of 20 to 45 minutes is made with intermediate pauses of 30 to 60 minutes. On very hot and in particular windy days, continuous operation may also be expedient.

The continuous wetting of the ground may lead to a noticeable lowering of the ambient temperature. This applies especially to sunlit gravel pits which are protected from the wind. Due to wetting, the ground is kept cool, which considerably reduces the radiation heat radiated from the ground.

Examples of ground-wetting dust binding apparatus units with suspended spray nozzles 20, as shown in FIGS. 5 and 6, are explained below.

In a first embodiment, the throwing range is 4 meters, and the throwing cone forms a full circle. Operating pressure lies in the range of 2 to 3 bar. The area wetted per spray nozzle 20 comes to around 50 m$^2$ and consumption of binder amounts to approx. 70 liters per hour per nozzle.

This results in a precipitation rate of around 1.4 liters/m$^2$ in continuous operation.

In a second embodiment, the throwing range is 4.8 meters, while the throwing cone again forms a full circle. Operating pressure lies in the range of 1.5 to 4.5 bar. The wetted area amounts to around 72 m$^2$ and consumption amounts to approx. 70 liters of binder per hour per spray nozzle. This results in a precipitation rate of around 0.97 liters per m$^2$ per hour in continuous operation.

Typical examples of running time for a dust binding apparatus with such suspended nozzles are explained below, wherein these examples of running time apply to both types of nozzle.

In the case of sealed ground, such as asphalt or concrete, the ground is initially wetted in cool weather conditions (temperature<13° C.) for a period of 10 to 20 minutes. Fresh wetting takes place after a pause of one to several hours. In warm weather (13° C.<temperature<20° C.), wetting takes place for 10 to 30 minutes, with the pause time between consecutive wettings being from around half an hour to a whole hour. The further wettings are again carried out over a period of around 10 to 30 minutes.

In hot weather (temperature>20° C.), the ground is wetted for a period of 10 to 30 minutes. Pause times amount to around 20 to 30 minutes. The stronger the wind, the longer the wetting times and therefore the shorter the pause times that are set.

In the case of open natural surfaces such as gravel, crushed stone or sand, in cool weather (temperature<13° C.), wetting takes place in the morning for 1 to 1.5 hours, with no further wetting for the rest of the day. In warm weather (13° C.<temperature<20° C.), again wetting takes place in the morning for 1 to 1.5 hours. After pauses of 0.5 to 4 hours further wetting is effected for a period of 20 to 40 minutes. In hot weather (temperature>20° C.), wetting takes place in the morning for 1 to 1.5 hours, with further wetting for periods of 30 to 40 minutes. Pauses between individual wettings amount to 30 to 60 minutes.

The stronger the wind, the longer are the set wetting times, and the shorter the pauses. On hot windy days, continuous operation of the dust binding apparatus may also be expedient.

Such a dust binding apparatus with suspended nozzles may be formed by a pipeline 17 serving as a binder line with an inside diameter of 28 mm, with branch lines 19 and spray nozzles 20 arranged at regular intervals (approx. 6 to 7 meters). For a section of the dust binding apparatus with a length of 350 in and 59 spray nozzles, consumption amounts to 70 liters of binder per hour per nozzle, and total consumption is around 4.13 m$^3$/h. The pipe volume comes to 67 liters. This corresponds to 1.6% of the total consumption per hour. Such a low pipe volume can be refilled rapidly after a pause or standstill. Refilling may be effected using a conventional standard pump, without the need for a pressure vessel or pressure valve, which serves as run-out stop.

For a dust binding apparatus with standing arrangement of the spray nozzles, a pipe section, for example, with an inside diameter of 61.2 m may be provided over a length of 500 m. The pipe volume is then around 1470 liters. 72 spray nozzles are arranged every 7 m, each having a consumption of 190 liters of binder per hour and per nozzle. Total consumption is therefore around 13.7 m$^3$/h. The pipe volume therefore amounts to around 10% of the total consumption per hour. This means that, with a complete emptying of the pipe volume, it takes around 6 minutes for the pipe volume to be refilled with binder, when the binder is conveyed at a constant rate. The rapid filling of a large volume causes a risk of pressure shocks, as already explained above. For such a dust binding apparatus it is therefore expedient to provide a pressure vessel with gas cushion, with a usable volume corresponding roughly to the pipe volume. Here, a pressure vessel with a usable volume of 1500 liters would be expedient. Alternatively, or additionally, a special pump may be provided, in particular a speed-controlled pump or a pump with especially high delivery rate, in order to convey the binder quickly. Alternatively, or additionally, self-closing pressure control valves or pressure nozzles, which prevent or delay run-out, may also be provided.

The longer the dust binding apparatus units, the greater—as a rule—is the inside diameter of the pipe section 13. For a line length of for example 1.6 km it is sensible to provide a pipe (rigid PE) with an inside diameter of 130.8 mm. In this case, 189 spray nozzles (standing arrangement) are connected roughly every 8.5 m. Each has a consumption of 470 liters per h and per nozzle, with total consumption coming to around 88.8 m$^3$/h. The pipe volume amounts to approx. 21 m$^3$. This corresponds to around 25% of the consumption of binder per hour. With constant delivery, refilling of a completely emptied pipe volume would take around 15 minutes. Such a long delay is in principle unacceptable. It is therefore advisable, with such a large pipe volume, for run-out or emptying to be avoided or considerably delayed. This may be achieved by means of self-closing pressure control valves or pressure nozzles. With a standing nozzle arrangement, however, this is not necessary so long as the dust binding apparatus runs horizontally. In the case of dust binding apparatus extending over a difference in height which is greater than the height of the standpipes 14, it is expedient to provide the lower-lying spray nozzles with an automatically opening pressure control valve or pressure nozzle. However, with longer periods of inactivity, partial draining is difficult to avoid completely. It is therefore expedient to provide, in pipelines of a dust binding apparatus 1 with such a large pipe volume, pressure vessels with gas cushion and/or flow restrictor valves, so that on refilling, a predetermined maximum velocity is not exceeded.

It may therefore be stated that, with low pipe volumes as compared with regular consumption (pipe volume<3% of binder consumption per hour), no special measures are required for refilling. For fairly large pipe volumes, on the other hand, suitable measures should be taken (e.g. pressure vessels, self-closing pressure control valves or pressure nozzles, special pumps). In the case of large pipe volumes (more than 15% of the regular binder consumption per hour or in particular more than 20% of the regular binder consumption per hour), then the run-out or draining of the pipeline should be avoided or considerably delayed. Suitable measures for this purpose are the provision of self-closing pressure control valves and pressure nozzles. For dust binding systems with a standing arrangement, self-closing pressure control valves and pressure nozzles are not in themselves necessary if the dust binding apparatus is arranged in a horizontal plane. However, this is very seldom the case, since the dust binding systems according to the invention generally extend over quite long distances. The use of self-closing pressure control valves and pressure nozzles is, however, also advantageous since pressurized binder is then always available in the binder line, so that rapid start-up is possible after a pause.

Examples of dust binding apparatus units for creating fog and with suspended spray nozzles 21, as shown in FIGS. 5 and 6, will be explained below.

There are individual fog nozzles and individual nozzles combined into a group of four.

The fog emission range amounts to around 80 cm per nozzle, measured horizontally at the nozzle. By the time the fog has reached the ground, it has expanded to approx. 1.5 m.

The individual nozzle consumes, with an operating pressure of 4 bar, around 7.5 liters of binder per hour; the 4-nozzle version about 30 liters per hour. With pulsed operation, this results in consumption of around 0.002 liters per second and 0.008 liters per second, respectively.

Such a dust binding apparatus may also be designed as a low-flow dust binding apparatus. The individual nozzle then consumes around 5.5 liters of binder per hour and the 4-nozzle version approx. 22 liters of binder per hour (0.0015 l/sec and 0.006 l/sec respectively).

The individual nozzles are generally installed in the pipeline around 10 cm apart, and the 4-nozzle units around 0.5 to 2 meters apart.

Since part of the fog evaporates, it is difficult to determine a precipitation rate for a dust binding apparatus producing fog, since this depends heavily on the current climatic conditions.

Examples of running times are explained below:
Case 1: Dust Binding at a Stone Crusher Machine
When the stone crusher machine is stationary, dust binder is inactive. When the stone crusher machine is in operation, fog is produced continuously.

The stone crusher machine is provided on two sides with a fogging line, each being 3 metres long and arranged 1.7 metres from the stone crusher machine.

The nozzles are spaced 1 metre apart, with six spray nozzles being provided. Operating pressure is 5 bar. Water consumption comes to (6×34=) 204 liters per hour in continuous operation.

Case 2: Indoor Dust Binding
In a refuse sorting building, several dust binding lines are fixed to the ceiling of the building, 2 meters apart, with spray nozzles (groups of 4) fitted every 1.5 meters. A total of 350 dust binding nozzles are provided, which, with an operating pressure of 5 bar, have a water consumption of 11,900 liters per hour in continuous operation.

A spray pulse of 2 seconds duration is generated every 28 seconds. The mist is emitted at the building ceiling and falls downwards.

Each pulse consumes 6.6 liters of binder. This results in an effective binder consumption of around 800 liters per hour. This is only one-fifteenth of the consumption in continuous operation.

Case 3: Construction Vehicle
A dust-generating construction vehicle produces continuous dusty air when operating by swirling up dust from the ground, which rises from the ground and moves away.

Attached to the construction machine on two sides are spray nozzles at a height of 1.5 meters above the ground. Altogether ten spray nozzles are attached, with an hourly consumption of 300 liters at an operating pressure of 4 bar.

To save water in mobile operation, the misting system is operated on a pulsed basis. In each case mist is emitted for 1 second, then there is a pause for 4 seconds.

Each mist pulse leads to a consumption of 0.08 liters of binder. For each hour of pulsed operation, binder consumption is 60 liters. Consequently, only a fifth of the amount of binder is used as compared with continuous misting.

LIST OF REFERENCE NUMBERS

1 dust binding apparatus
2 roadway
3 ramp
4 gravel pit
5 screening unit
6 conveyor belt run
7 feed hopper
8 processing shed
9 transfer point
10 wetting device
11 fog screen unit
12 fog wall
13 pipe section
14 standpipe
15 spray nozzle
16 bearer cable
17 pipeline
18 pipeline hook
19 flexible branch line
20 spray nozzle
21 spray nozzle
22 gutter
23 tank
24 pump
25 filter
26 binder source
27 pump
28 line section 29 shut-off valve
30 non-return valve
31 line
32 switching valve
33 pressure reducer
34 branch run
35 branch run
36 branch run
37 branch run
38 central control unit
39 filter
40 nozzle run
41 pressure vessel with gas cushion
42 feed line
43 discharge line
44 non-return valve
45 switching valve
46 flow meter
47 switching valve
48 flow meter
49 auxiliary run
50 main run
51 flow meter
52 stabiliser
53 pressure reducer
54 non-return valve
55 mast
56 tension cable
57 building
58 well bore
59 deep pump
60 branch run
61 drain hole
62 control valve

The invention claimed is:

1. An apparatus for binding of dust, the apparatus comprising:
a binder reservoir that provides liquid binder that is under pressure; and
a binder line connected to the binder reservoir, wherein the binder line is flexible and is suspended from a bearer cable, the binder line is arranged roughly parallel to the bearer cable and fastened to the bearer cable at several points, and the binder line includes one or more flexible branch lines that branch off from a main run of the binder line fastened to the bearer cable,
wherein at least one spray nozzle for spraying out the binder is connected to the binder line with at least one spray nozzle fitted to each of the branch lines.

2. The apparatus according to claim 1, wherein the binder line has a length of at least 100 meters, along which several spray nozzles are arranged.

3. The apparatus according to claim 1, wherein the apparatus is so designed that no more than 6 liters per square meter per hour of binder is discharged onto the ground during a spraying operation.

4. The apparatus according to claim 1, wherein the apparatus is arranged at a height of at least 5 meters above the ground.

5. The apparatus according to claim 1, wherein the spray nozzles are designed with a circular or circular-segment-shaped spray cone, with a maximum distance between two adjacent spray nozzles not exceeding 80% of the diameter of the spray cone.

6. The apparatus according to claim 1, wherein the apparatus is so designed that no more than 3 liters per square meter per hour of binder are discharged during a spraying operation.

7. The apparatus according to claim 1, wherein the spray nozzles are arranged along the binder line at intervals of no more than 10 meters.

8. The apparatus according to claim 1, wherein the binder reservoir provides the binder at a maximum pressure of 10 bar, and/or the binder reservoir provides the binder at a pressure of at least 2 bar.

9. The apparatus according to claim 1, wherein the spray nozzles are so designed that the binder is sprayed with a droplet size of 30 to 120 micrometers.

10. The apparatus according to claim 1, wherein at least one spray nozzle is a pressure nozzle, which opens automatically from a certain opening pressure of the fed binder upwards or is combined with an automatic pressure control valve, and the apparatus has a pressure control, by which the pressure in the binder line may be controlled.

11. The apparatus according to claim 10, wherein the pressure control has a control valve which is fitted in the binder line in an area between the binder reservoir and the pressure nozzle and may be activated by a control unit.

12. The apparatus according to claim 1, wherein the binder reservoir comprises at least one pressure vessel with gas cushion, which is divided into a gas pressure chamber and a binder chamber.

13. The apparatus according to claim 12, wherein the pressure vessel with gas cushion has a feed line for filling the pressure vessel with gas cushion and a discharge line for draining the pressure vessel with gas cushion, wherein the feed line has a flow resistance compared to the discharge line so that filling of the pressure vessel with gas cushion takes place with a lower volumetric flow than draining of the pressure vessel with gas cushion.

14. The apparatus according to claim 13, wherein the discharge line has a non-return valve, so that binder can flow through the discharge line only for draining the pressure vessel.

15. The apparatus according to claim 1, wherein the apparatus has a pump that pumps the binder, and connected to the binder line is a pressure switch that switches on the pump if a predetermined switch-on pressure is undershot at a switch-on time.

16. The apparatus according to claim 15, wherein the pressure switch is so designed that, if a predetermined switch-off pressure is exceeded at a switch-off time, the pump switches off or an emergency release valve opens.

17. The apparatus according to claim 16, wherein at least one switch-off delay device is provided, which allows the pump to be switched off only after a predetermined delay interval has elapsed, wherein the delay interval commences with the switch-on time or the switch-off time or a point in time between the switch-on time and the switch-off time.

18. The apparatus according to claim 16, wherein an excess pressure switch is connected to the binder line, and, if a predetermined excess pressure which is greater than the switch-off pressure is detected, the excess pressure switch switches off the pump and/or opens an emergency release valve.

19. The apparatus according to claim 15, wherein a flow meter is connected to the binder line so that if flow falls below a predetermined minimum flow rate at a switch-off time, the pump switches off or an emergency release valve opens.

20. The apparatus according to claim 15, wherein a flow monitor provided in the binder line measures flow in the binder line and switches off the pump if, after expiry of a predetermined delay interval after switching on the pump, the flow is less than a predetermined flow value.

21. The apparatus according to claim 20, wherein the binder line has a main run and an auxiliary run, the auxiliary run having a smaller cross-section than the main run and running parallel to the main run, wherein the flow monitor is located in the auxiliary run.

22. The apparatus according to claim 20, wherein the flow monitor detects the flow indirectly based on a temperature of the binder in the pump or in a flow direction shortly after the pump, power consumption of the pump, pressure difference before or after the pump, a pressure after a pump nozzle based on noise of the pump, and/or current energy consumption of a pump shaft.

23. The apparatus according to claim 1, wherein a venting device is provided in the binder line.

24. The apparatus according to claim 23, wherein the venting device is a passive vent valve, which is permeable to gas and impermeable to fluids.

25. The apparatus according to claim 23, wherein the venting device is a switchable valve located in the binder line and opened by a control unit if a gas bubble is present, after predetermined time intervals have elapsed, or after passage of a certain number of predetermined operating states.

26. The apparatus according to claim 25, wherein the venting device is opened by the control unit if a gas bubble is present, and presence of a gas bubble is detected by the control unit based on a predetermined operating state and/or by means of a sensor.

27. The apparatus according to claim 1, wherein the binder line has one or more pressure control valves, which, as pressure switching valves, open from a predetermined switching pressure upwards and thereby release a binder feed to the spray nozzles, or, as pressure regulating valves, open from a predetermined switching pressure upwards and at the same time regulate pressure on an outflow side of the pressure regulating valve to a predetermined pressure range.

28. The apparatus according to claim 27, wherein several pressure control valves are provided in the binder line having different switching pressures, creating sections with different pressure levels in the binder line.

29. The apparatus according to claim 27, wherein one or more pressure control valves are provided in the main run of the binder line so that the main run is divided into sections with predetermined pressure levels.

30. The apparatus according to claim 27, wherein one or more pressure control valves are provided in a branch run of the binder line diverging from the main run of the binder line, so that the respective branch run is closed if pressure falls below the switching pressure, and each of the pressure control valves are integrated with a spray nozzle.

31. The apparatus according to claim 1, wherein the binder line has one or more pressure reducers, each of which regulates pressure on an outflow side of the pressure reducer to a predetermined pressure range, and the pressure reducers are preferably located adjacent to or integrated in a spraying valve.

32. The apparatus according to claim 1, wherein the binder line has an elasticity for elastic buffeting of binder of at least 1% of a total volume of the binder line, the elasticity of the binder line being based on pipe wall elasticity, at least one gas pocket and/or a diaphragm vessel.

33. The apparatus according to claim 1, wherein the binder line has an elasticity for elastic buffeting of binder of a maximum 100% of a total volume of the binder line, the elasticity of the binder line being based on pipe wall elasticity, at least one gas pocket and/or a pressure vessel with gas cushion.

34. A method of binding dust with a binder, wherein an apparatus for binding the dust comprises:
   a binder reservoir that provides liquid binder that is under pressure; and
   a binder line connected to the binder reservoir, wherein the binder line is flexible and is suspended from a bearer cable, the binder line is arranged roughly parallel to the bearer cable and fastened to the bearer cable at several points, and the binder line includes one or more flexible branch lines that branch off from a main run of the binder line fastened to the bearer cable, and wherein at least one spray nozzle for spraying out the binder is connected to the binder line with at least one spray nozzle fitted to each of the branch lines;
wherein the method comprises:
   the binder being discharged at intervals with spraying phases and pause phases; and
   the at least one spray nozzle aligns itself vertically independently due to its weight and the elastic binder line serves to equalise the pressure and reduce the effects of pressure surges.

35. The method according to claim 34, wherein, for wetting ground, the spraying phases and the pause phases are at least 2 minutes, and/or, for creating an artificial fog, the spraying phases and the pause phases lie in a range of 1 second to 120 seconds.

* * * * *